US011279181B2

(12) United States Patent
Kishizoe

(10) Patent No.: US 11,279,181 B2
(45) Date of Patent: *Mar. 22, 2022

(54) PNEUMATIC TIRE

(71) Applicant: The Yokohama Rubber Co., LTD., Tokyo (JP)

(72) Inventor: Isamu Kishizoe, Hiratsuka (JP)

(73) Assignee: The Yokohama Rubber Co., LTD.

( * ) Notice: Subject to any disclaimer, the term of this patent is extended or adjusted under 35 U.S.C. 154(b) by 379 days.

This patent is subject to a terminal disclaimer.

(21) Appl. No.: 16/329,718

(22) PCT Filed: Aug. 7, 2017

(86) PCT No.: PCT/JP2017/028639
§ 371 (c)(1),
(2) Date: Feb. 28, 2019

(87) PCT Pub. No.: WO2018/043055
PCT Pub. Date: Mar. 8, 2018

(65) Prior Publication Data
US 2019/0193489 A1 Jun. 27, 2019

(30) Foreign Application Priority Data

Sep. 2, 2016 (JP) .............................. JP2016-172197

(51) Int. Cl.
*B60C 19/08* (2006.01)
*B60C 11/12* (2006.01)
(Continued)

(52) U.S. Cl.
CPC .............. *B60C 19/08* (2013.01); *B60C 11/00* (2013.01); *B60C 11/005* (2013.01);
(Continued)

(58) Field of Classification Search
CPC ....... B60C 11/005; B60C 19/08; B60C 11/11; B60C 2011/0025; Y10S 152/00; Y10S 152/02
See application file for complete search history.

(56) References Cited

U.S. PATENT DOCUMENTS 4,619,300 A * 10/1986 Tokunaga ........... B60C 11/0306
152/209.11
2007/0261773 A1  11/2007 Onuma et al.
(Continued)

FOREIGN PATENT DOCUMENTS

CN        101259818        9/2008
EP        2 520 420        11/2012
(Continued)

OTHER PUBLICATIONS

English translation of JP-2000016010-A by EPO. (Year: 2000).*
(Continued)

*Primary Examiner* — Leith S Shafi
*Assistant Examiner* — Inja Song
(74) *Attorney, Agent, or Firm* — Thorpe North & Western

(57) ABSTRACT

In a pneumatic tire, a modulus at 300% elongation of a cap tread ranges from 3.0 Mpa to 7.0 Mpa, and the modulus at 300% elongation of an undertread ranges from 10.0 Mpa to 20.0 Mpa. Additionally, an earthing tread is made from a rubber material with a volume resistivity of $1 \times 10^7$ Ω·cm or less. The earthing tread is made from the same rubber material as the undertread and has an integral structure with the undertread.

16 Claims, 11 Drawing Sheets

(51) Int. Cl.
*B60C 11/00* (2006.01)
*B60C 11/03* (2006.01)
*B60C 11/11* (2006.01)

(52) U.S. Cl.
CPC ........... *B60C 11/0327* (2013.01); *B60C 11/11* (2013.01); *B60C 11/12* (2013.01); *B60C 11/1236* (2013.01); *B60C 11/1259* (2013.01); B60C 2011/0025 (2013.01); B60C 2011/0353 (2013.01); B60C 2011/1213 (2013.01)

(56) References Cited

U.S. PATENT DOCUMENTS

| | | | |
|---|---|---|---|
| 2008/0216930 A1 | 9/2008 | Valentine et al. | |
| 2009/0050257 A1 | 2/2009 | Frerichs | |
| 2010/0243115 A1 | 9/2010 | Wada | |
| 2012/0160423 A1 | 6/2012 | Frerichs | |
| 2013/0153111 A1 | 6/2013 | Muramatsu et al. | |
| 2015/0158344 A1* | 6/2015 | Kishizoe | B60C 19/08 152/152.1 |
| 2018/0178594 A1* | 6/2018 | Nagayoshi | B60C 11/005 |
| 2019/0344624 A1* | 11/2019 | Bender | B60C 11/14 |

FOREIGN PATENT DOCUMENTS

| | | | | |
|---|---|---|---|---|
| EP | 2 610 076 | | 7/2013 | |
| JP | H10-16512 | | 1/1998 | |
| JP | 11115414 A | * | 4/1999 | ............ B60C 19/08 |
| JP | H11-115414 | | 4/1999 | |
| JP | 2000-016010 | | 1/2000 | |
| JP | 2000016010 A | * | 1/2000 | |
| JP | 2000-085316 | | 3/2000 | |
| JP | 2007-203961 | | 8/2007 | |
| JP | 3964511 | | 8/2007 | |
| JP | 4220569 | | 2/2009 | |
| JP | 2009-532232 | | 9/2009 | |
| WO | WO 2005/077680 | | 8/2005 | |
| WO | WO 2007/112809 | | 10/2007 | |
| WO | WO 2009/060647 | | 5/2009 | |
| WO | WO 2012/026588 | | 3/2012 | |
| WO | WO 2014/049862 | | 4/2014 | |

OTHER PUBLICATIONS

English translation of JP-11115414-A by EPO. (Year: 1994).*
International Search Report for International Application No. PCT/JP2017/028639 dated Oct. 31, 2017, 4 pages, Japan.
European Office Action for European Application No. 17846064.8 dated Feb. 28, 2020, 7 pages, Germany.

* cited by examiner

| EARTHING TREAD STRUCTURE | CONVENTIONAL EXAMPLE | COMPARATIVE EXAMPLE | EXAMPLE 1 | EXAMPLE 2 | EXAMPLE 3 | EXAMPLE 4 |
|---|---|---|---|---|---|---|
| | SEPARATE STRUCTURE | SEPARATE STRUCTURE | INTEGRAL STRUCTURE | INTEGRAL STRUCTURE | INTEGRAL STRUCTURE | INTEGRAL STRUCTURE |
| MODULUS M_cap (Mpa) | 6.0 | 4.5 | 4.5 | 4.5 | 4.5 | 4.5 |
| MODULUS M_ut (Mpa) | 9.0 | 12.0 | 12.0 | 15.0 | 15.0 | 15.0 |
| MODULUS M_ea (Mpa) | 10.0 | 10.0 | 12.0 | 15.0 | 15.0 | 15.0 |
| M_EA − M_cap (Mpa) | 4.0 | 4.0 | 7.5 | 10.5 | 10.5 | 10.5 |
| W2/W1 | 0.10 | 0.10 | 0.40 | 0.40 | 0.60 | 0.70 |
| THICKENED PORTION OF UNDERTREAD | NO | NO | NO | NO | NO | YES |
| H1/H0 | 0.20 | 0.20 | 0.20 | 0.20 | 0.20 | 0.45 |
| H2/H0 | 0.20 | 0.20 | 0.20 | 0.20 | 0.20 | 0.20 |
| Ga1 − Ga2 (mm) | - | - | - | - | - | 2.0 |
| D1/W3 | - | - | - | - | - | 0.18 |
| W4/W3 | - | - | - | - | - | 0.50 |
| We1 (mm) | 1.0 | 1.0 | 1.0 | 1.0 | 1.0 | 1.0 |
| We2 (mm) | 1.0 | 1.0 | 1.0 | 1.0 | 1.0 | 1.0 |
| BRAKING PERFORMANCE ON ICE | 100 | 110 | 110 | 111 | 112 | 113 |
| ELECTROSTATIC SUPPRESSION PERFORMANCE (Ω) | 2 × 10^8 | 2 × 10^8 | 7 × 10^7 | 7 × 10^7 | 6 × 10^7 | 5 × 10^7 |
| SEPARATION RESISTANCE PERFORMANCE | 100 | 95 | 103 | 103 | 103 | 110 |

FIG. 9A

| EARTHING TREAD STRUCTURE | EXAMPLE 5 | EXAMPLE 6 | EXAMPLE 7 | EXAMPLE 8 | EXAMPLE 9 | EXAMPLE 10 |
|---|---|---|---|---|---|---|
| | INTEGRAL STRUCTURE | INTEGRAL STRUCTURE | INTEGRAL STRUCTURE | INTEGRAL STRUCTURE | INTEGRAL STRUCTURE | INTEGRAL STRUCTURE |
| MODULUS M_cap (Mpa) | 4.5 | 4.5 | 4.5 | 4.5 | 4.5 | 4.5 |
| MODULUS M_ut (Mpa) | 15.0 | 15.0 | 15.0 | 15.0 | 15.0 | 15.0 |
| MODULUS M_ea (Mpa) | 15.0 | 15.0 | 15.0 | 15.0 | 15.0 | 15.0 |
| M_EA - M_cap (Mpa) | 10.5 | 10.5 | 10.5 | 10.5 | 10.5 | 10.5 |
| W2/W1 | 0.70 | 0.70 | 0.70 | 0.70 | 0.70 | 0.70 |
| THICKENED PORTION OF UNDERTREAD | YES | YES | YES | YES | YES | YES |
| H1/H0 | 0.48 | 0.48 | 0.45 | 0.45 | 0.45 | 0.45 |
| H2/H0 | 0.20 | 0.48 | 0.48 | 0.48 | 0.48 | 0.48 |
| Ga1 - Ga2 (mm) | 2.5 | 0 | 2.0 | 2.0 | 2.0 | 2.0 |
| D1/W3 | 0.18 | 0.18 | 0.10 | 0.04 | 0.10 | 0.10 |
| W4/W3 | 0.50 | 0.50 | 0.50 | 0.50 | 0.60 | 0.60 |
| We1 (mm) | 1.0 | 1.0 | 1.0 | 1.0 | 1.0 | 2.0 |
| We2 (mm) | 1.0 | 1.0 | 1.0 | 1.0 | 1.0 | 4.0 |
| BRAKING PERFORMANCE ON ICE | 115 | 115 | 116 | 114 | 118 | 118 |
| ELECTROSTATIC SUPPRESSION PERFORMANCE($\Omega$) | $4 \times 10^7$ | $4 \times 10^7$ | $5 \times 10^7$ | $5 \times 10^7$ | $5 \times 10^7$ | $1 \times 10^6$ |
| SEPARATION RESISTANCE PERFORMANCE | 109 | 107 | 115 | 115 | 117 | 120 |

FIG. 9B

PNEUMATIC TIRE

TECHNICAL FIELD

The technology relates to a pneumatic tire and particularly relates to a pneumatic tire that can provide improved separation resistance performance while maintaining performance on ice.

BACKGROUND ART

Studless tires are required to have good performance on ice and performance on snow, as well as good wet performance and rolling resistance. Accordingly, in recent years, a tread structure in which the rubber compound of the cap tread has an increased silica content has been employed.

However, because silica is a good insulator, the electrical resistance value of the cap tread increases when the silica content of the cap tread increases. Accordingly, the tire-to-road surface electrical discharge properties decrease and the electrostatic suppression performance of the tire decreases. Because of this, recent studless tires have employed an electrostatic suppressing structure including an earthing tread. The technologies described in Japan Patent Nos. 3964511 and 4220569 are known pneumatic tires using such a structure.

However, increasing the silica content of the cap tread increases the difference in modulus between the earthing tread and the cap tread. This increases the difference in ground contact pressure between the earthing tread and the cap tread, causing separation at the boundary face between the earthing tread and the cap tread to readily occur.

SUMMARY

The present technology provides a pneumatic tire that can provided improved separation resistance performance while maintaining performance on ice.

A pneumatic tire according to an embodiment of the technology includes a carcass layer, a belt layer disposed outward of the carcass layer in a radial direction, a tread rubber disposed outward of the belt layer in a radial direction, and a plurality of main grooves and a plurality of blocks defined by the plurality of main grooves formed in a tread surface, the tread rubber including a cap tread forming the tread surface, an undertread disposed in a layer below the cap tread; and an earthing tread extending through the cap tread and exposed on a road contact surface of the block, a modulus at 300% elongation of the cap tread ranging from 3.0 Mpa to 7.0 Mpa, a modulus at 300% elongation of the undertread ranging from 10.0 Mpa to 20.0 Mpa, the earthing tread being made from a rubber material with a volume resistivity of $1 \times 10^7$ Ω·cm or less, and the earthing tread being made from the same rubber material as the undertread and having an integral structure with the undertread.

In a pneumatic tire according to an embodiment of the technology, the modulus at 300% elongation of the cap tread ranging from 3.0 Mpa to 7.0 Mpa is advantageous in appropriately setting the modulus M_cap of the cap tread and thus improving the performance on ice (braking performance on ice) of the tire. Additionally, the earthing tread and the undertread having an integral structure made from the same rubber material is advantageous in effectively suppressing the separation at the boundary face between the earthing tread and thus the cap tread and improving the separation resistance performance of the tire.

BRIEF DESCRIPTION OF DRAWINGS

FIGS. 9A-9B include a table showing the results of performance tests of pneumatic tires according to embodiments of the technology.

DETAILED DESCRIPTION

Embodiments of the technology are described in detail below with reference to the drawings. However, the technology is not limited to these embodiments. Moreover, constituents of the embodiments include elements that are substitutable while maintaining consistency with the technology, and obviously substitutable elements. Furthermore, the modified examples described in the embodiments can be combined as desired within the scope apparent to one skilled in the art.

Pneumatic Tire

Figure 1:
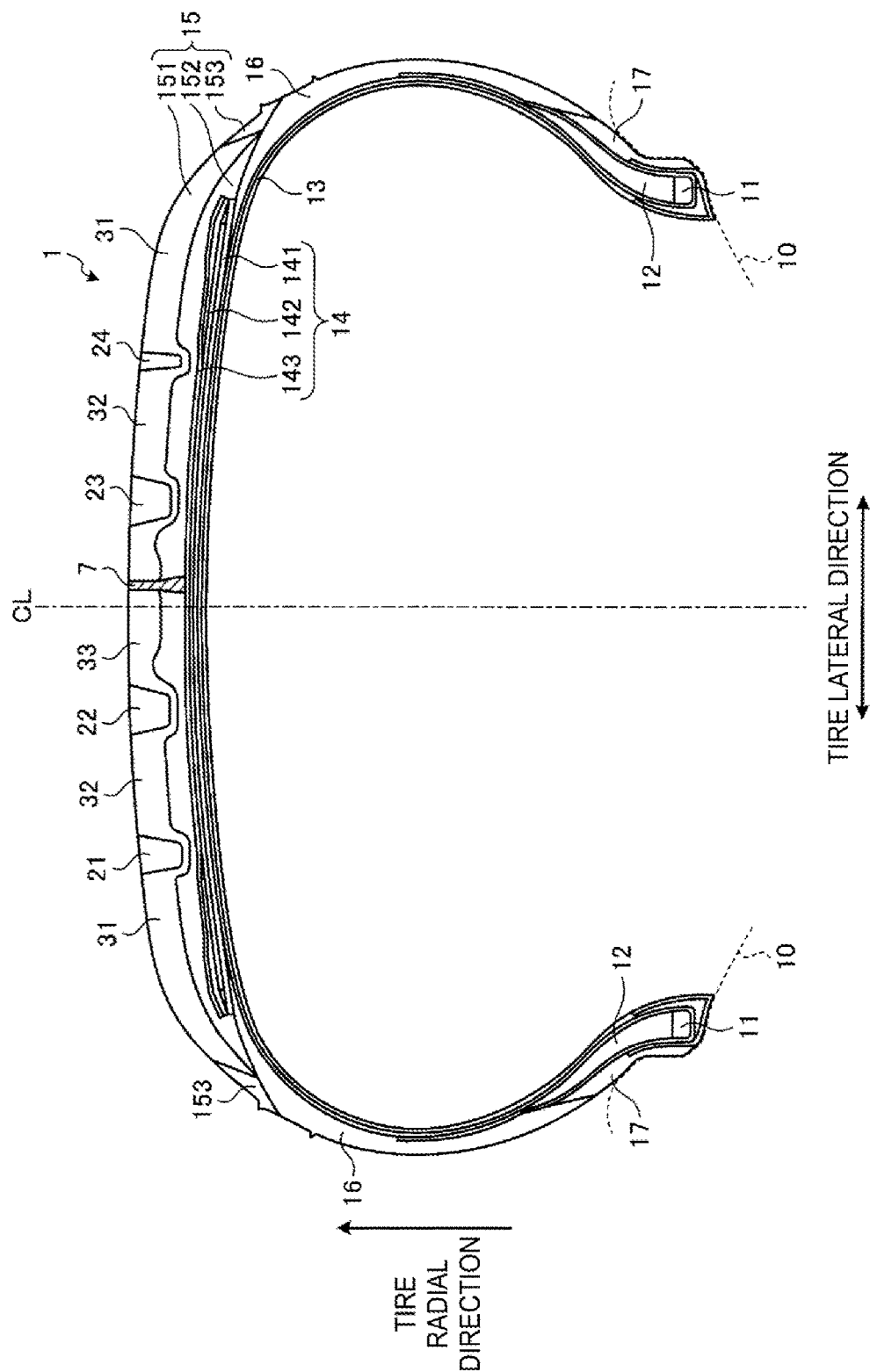
FIG. 1 is a cross-sectional view in a tire meridian direction illustrating a pneumatic tire according to an embodiment of the technology.

FIG. 1 is a cross-sectional view in a tire meridian direction illustrating a pneumatic tire according to an embodiment of the technology. The same drawing illustrates a half region in the tire radial direction. Also, the same drawing illustrates a radial tire for a passenger vehicle as an example of a pneumatic tire. Note that the reference sign CL denotes a tire equatorial plane. Herein, "tire lateral direction" refers the direction parallel with the tire rotation axis (not illustrated). "Tire radial direction" refers to the direction perpendicular to the tire rotation axis.

The pneumatic tire 1 has an annular structure with the tire rotation axis as its center and includes a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The pair of bead cores 11, 11 have annular structures and constitute cores of left and right bead portions. The pair of bead fillers 12, 12 are disposed outward of the pair of bead cores 11, 11 in the tire radial direction and reinforce the bead portions.

The carcass layer 13 extends between the left and right bead cores 11, 11 in a toroidal shape, forming the framework of the tire. Additionally, both end portions of the carcass layer 13 are turned back outwardly in the tire lateral direction to wrap around the bead cores 11 and the bead fillers 12 and fixed. The carcass layer 13 is made by performing a rolling process on coating rubber-covered plural carcass cords made of steel or an organic fiber material (e.g. aramid, nylon, polyester, rayon, or the like). The carcass layer 13 has a carcass angle (inclination angle of the fiber direction of the carcass cords with respect to the tire circumferential direction), as an absolute value from 80 degrees to 95 degrees. Note that in the configuration of FIG. 1, the carcass layer 13 has a single layer structure including a single carcass ply. However, no such limitation is intended, and the carcass layer 13 may have a multilayer structure formed by layering a plurality of carcass plies (not illustrated).

The belt layer 14 is a multilayer structure including a pair of cross belts 141, 142 and a belt cover 143 and is disposed around the outer circumference of the carcass layer 13. The pair of cross belts 141, 142 are made by performing a rolling process on coating rubber-covered plural belt cords made of steel or an organic fiber material. The cross belts 141, 142 have a belt angle, as an absolute value, from 20 degrees to 40 degrees. Furthermore, the pair of cross belts 141, 142 have belt angles (inclination angle of the fiber direction of the belt cords with respect to the tire circumferential direction) of opposite signs, and the belts are layered so that the fiber directions of the belt cords intersect each other (crossply structure). The belt cover 143 is made by performing a rolling process on coating-rubber-covered plural belt cords made of steel or an organic fiber material. The belt cover 143 has a belt angle, as an absolute value, from −10 to 10 degrees. The belt cover 143 is disposed in a layered manner outward of the cross belts 141, 142 in the tire radial direction.

The tread rubber 15 is disposed outward of the carcass layer 13 and the belt layer 14 in the tire radial direction and constitutes a tread portion. The tread rubber 15 includes a cap tread 151, an undertread 152, and left and right wing tips 153, 153. The cap tread 151 includes a tread pattern and constitutes the exposed portion of the tread rubber 15 (tread contact surface or the like). The undertread 152 is disposed between the cap tread 151 and the belt layer 14 and constitutes the base portion of the tread rubber 15. The wing tips 153 are disposed at left and right end portions of the cap tread 151 in the tire lateral direction and constitute a part of the buttress portion.

For example, in the configuration of FIG. 1, the cap tread 151 sandwiches the undertread 152 with the belt layer 14 and is layered completely covering the undertread 152. The wing tips 153, 153 are disposed at the boundary portions between the left and right end portions of the cap tread 151 and the left and right sidewall rubbers 16, 16 and are exposed on the surface of the buttress portion.

The pair of sidewall rubbers 16, 16 are disposed outward of the carcass layer 13 in the tire lateral direction and constitute left and right sidewall portions. For example, in the configuration of FIG. 1, the outer end portions of the sidewall rubbers 16 in the tire radial direction are inserted in a layer below the tread rubber 15 and are sandwiched between the tread rubber 15 and the carcass layer 13.

The pair of rim cushion rubbers 17, 17 are disposed outward of the left and right bead cores 11, 11 and the bead fillers 12, 12 in the tire lateral direction, and constitute left and right bead portions. For example, in the configuration of FIG. 1, the outer end portions of the rim cushion rubbers 17 in the tire radial direction are inserted in a layer below the sidewall rubbers 16 and are sandwiched between the sidewall rubbers 16 and the carcass layer 13.

Tread Block

Figure 2:
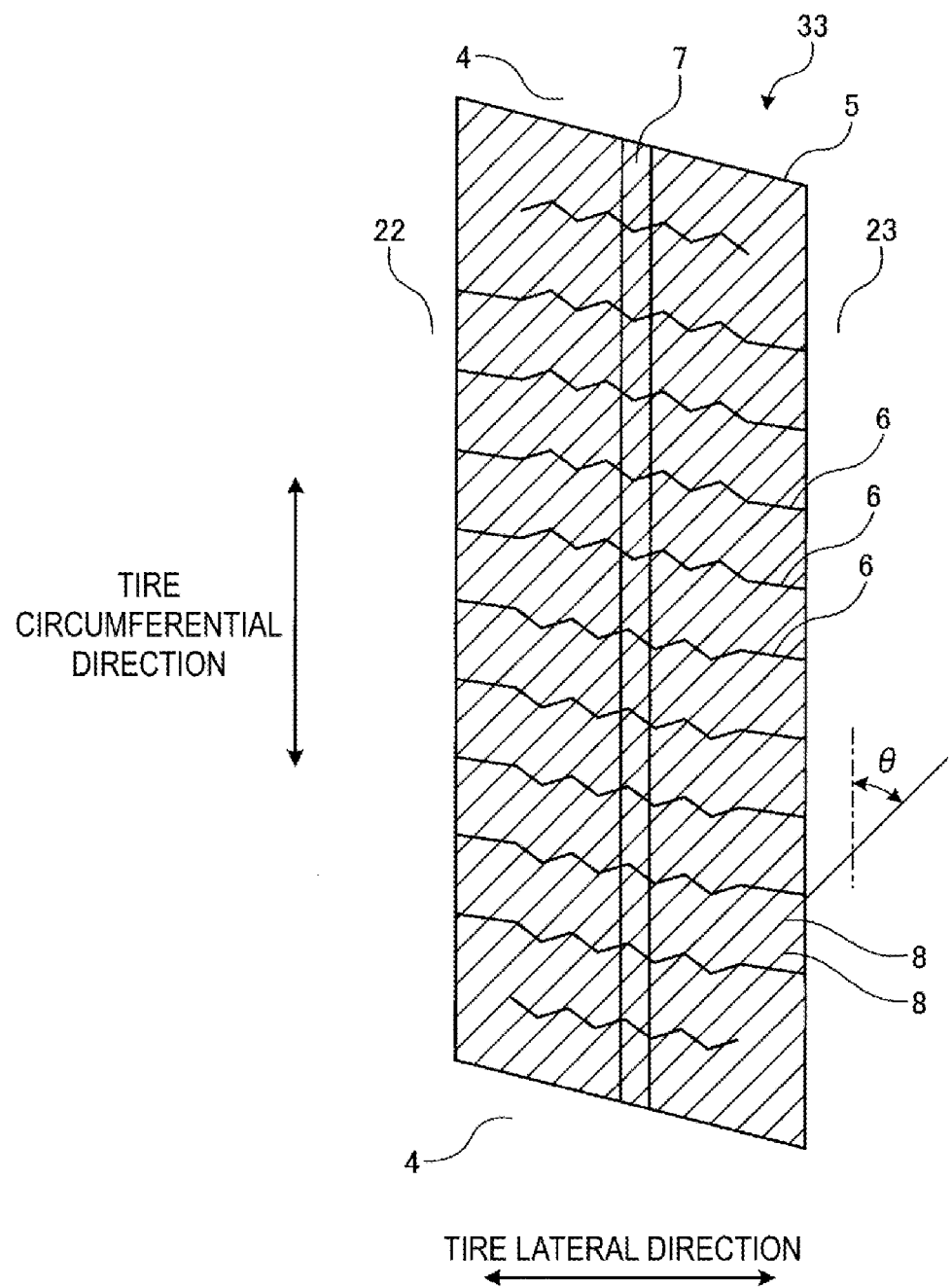
FIG. 2 is a plan view illustrating a block of the pneumatic tire illustrated in FIG. 1.

FIG. 2 is a plan view illustrating a block of the pneumatic tire illustrated in FIG. 1. The same drawing illustrates a block 5 including an earthing tread 7 that is described below. Note that "tire circumferential direction" refers to the direction revolving about the tire rotation axis.

Additionally, the pneumatic tire 1 includes a plurality of circumferential grooves 21 to 24 extending in the tire circumferential direction and a plurality of land portions 31 to 33 defined by the circumferential main grooves 21 to 23 in the tread surface (see FIG. 1). Additionally, the land portions 31 to 33 include a plurality of lug grooves 4 extending in the tire lateral direction and a plurality of the blocks 5 (see FIG. 2) defined and formed by the lug grooves 4.

"Main groove" is a groove required to display a wear indicator as specified by the Japan Automobile Tyre Manufacturers Association (JATMA) and typically has a groove width of 5.0 mm or greater and a groove depth of 6.5 mm or greater. "Lug groove" is a lateral groove extending in the tire lateral direction and typically has a groove width of 1.0 mm or greater and a groove depth of 3.0 mm or greater. "Sipe", described below, is a cut formed in the tread contact surface and typically has a sipe width of less than 1.0 mm and a sipe depth of 2.0 mm or greater, and closes when the tire comes into contact with the ground.

The groove width is the maximum distance between the left and right groove walls at the groove opening portion and is measured when the tire is mounted on a specified rim, inflated to the specified internal pressure, and in an unloaded state. In configurations in which the land portions include notch portions or chamfered portions on the edge portions thereof, the groove width is measured with reference to the intersection points where the tread contact surface and extension lines of the groove walls meet, when viewed in a cross-section normal to the groove length direction. Additionally, in configuration in which the grooves extend in a zigzag-like or wave-like manner in the tire circumferential direction, the groove width is measured with reference to the center line of the amplitude of the groove walls.

The groove depth is the maximum distance from the tread contact surface to the groove bottom and is measured when the tire is mounted on a specified rim, inflated to the specified internal pressure, and in an unloaded state. Additionally, in configurations in which the grooves include a ridged/grooved portion or sipes on the groove bottom, the groove depth is measured excluding these portions.

The sipe width is the maximum distance of the opening width of the sipe at the road contact surface of the land portion and is measured when the tire is mounted on a specified rim, inflated to the specified internal pressure, and in an unloaded state.

The sipe depth is the maximum distance from the tread contact surface to the sipe bottom and is measured when the tire is mounted on a specified rim, inflated to the specified internal pressure, and in an unloaded state. Additionally, in configurations in which the sipes include a partially ridged/grooved portion on the groove bottom, the sipe depth is measured excluding these ridged/grooved portions.

"Specified rim" refers to an "applicable rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO).

Additionally, "specified internal pressure" refers to a "maximum air pressure" defined by JATMA, to the maximum value in "TIRE LOAD LIMITS AT VARIOUS COLD INFLATION PRESSURES" defined by TRA, and to "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES"

defined by TRA, or "LOAD CAPACITY" defined by ETRTO. However, in the case of JATMA, for a passenger vehicle tire, the specified internal pressure is an air pressure of 180 kPa, and the specified load is 88% of the maximum load capacity.

For example, in the configuration of FIG. 1, the region on one side of the tire equatorial plane CL (the region on the left side of the drawing) includes two circumferential main grooves 21, 22, and the region on the other side (the region on the right side of the drawing) includes one circumferential main groove 23 and one circumferential narrow groove 24. The circumferential narrow groove 24 is located outermost in the tire lateral direction in the region on the other side. Five land portions 31 to 33 are defined by the circumferential grooves 21 to 24. The land portions 31 to 33 includes a left and right pair of shoulder land portions 31, 31, a left and right pair of second land portions 32, 32, and a center land portion 33. The center land portion 33 is located on the tire equatorial plane CL. As illustrated in FIG. 2, the center land portion 33 includes a pair of the circumferential main grooves 22, 23 and the block 5 defined and formed by a pair of the lug grooves 4, 4. The block 5 includes a road contact surface with a rectangular or parallelogram shape.

Note that no such limitation is intended, and three or five or more circumferential grooves may be disposed, or a circumferential main groove may be disposed instead of the circumferential narrow groove 24 of FIG. 1 (not illustrated). One circumferential groove may be located on the tire equatorial plane CL such that the center land portion 33 is disposed at a position away from the tire equatorial plane CL (not illustrated).

In the configuration of FIG. 2, the left and right circumferential main grooves 22, 23 defining the center land portion 33 have a straight shape. However, no such limitation is intended, and the circumferential main grooves 22, 23 may have a zigzag shape, a wave-like shape, or a step shape with amplitude in the tire lateral direction (not illustrated).

In the configurations illustrated in FIGS. 1 and 2, as described above, the pneumatic tire 1 includes the circumferential grooves 21 to 24 extending in the tire circumferential direction. Also, the center land portion 33 includes blocks 5 defined and formed by the adjacent circumferential main grooves 22, 23 and the lug grooves 4, 4. However, no such limitation is intended, and instead of the circumferential main grooves 21 to 24, the pneumatic tire 1 may include a plurality of inclined main grooves extending at an incline at a predetermined angle with respect to the tire circumferential direction (not illustrated). For example, the pneumatic tire 1 may be provided with a plurality of V-shaped inclined main grooves that have a V-shape projecting in the tire circumferential direction and extend in the tire lateral direction opening to the left and right tread edges, a plurality of lug grooves that connect adjacent V-shaped inclined main grooves, and a plurality of land portions that are defined by the V-shaped inclined main grooves and the lug grooves (not illustrated). In such a configuration, the blocks can be defined by adjacent inclined main grooves.

The pneumatic tire 1 preferably has a designated mounting direction on a vehicle when the pneumatic tire 1 is mounted on the vehicle such that the circumferential narrow groove 24 side (see FIG. 1) is located on the outer side in the vehicle width direction. A mounting direction indicator portion, for example, is constituted by a mark or ridges/grooves on the sidewall portion of the tire. For example, Economic Commission for Europe Regulation 30 (ECE R30) requires that a mounting direction indicator portion is provided on the sidewall portion on the outer side in the vehicle width direction when the tire is mounted on a vehicle.

The pneumatic tire 1 is preferably a snow tire, particularly a studless tire. The indicator portion indicating that it is a studless tire, for example, is constituted by a mark or ridges/grooves on the sidewall portion of the tire.

Electrostatic Suppressing Structure Including Earthing Tread

Studless tires are required to have good performance on ice and performance on snow, as well as good wet performance and rolling resistance. Accordingly, in recent years, a tread structure in which the rubber compound of the cap tread has an increased silica content has been employed.

However, because silica is a good insulator, the electrical resistance value of the cap tread increases when the silica content of the cap tread increases. Accordingly, the tire-to-road surface electrical discharge properties decrease and the electrostatic suppression performance of the tire decreases. Because of this, recent studless tires have employed an electrostatic suppressing structure including an earthing tread.

However, increasing the silica content of the cap tread decreases the modulus of the cap tread and increases the difference in modulus between the earthing tread and the cap tread. This increases the ground contact pressure of the earthing tread and increases the difference in ground contact pressure between the earthing tread and the cap tread. Accordingly, separation at the boundary face between the earthing tread and the cap tread, step wear between the earthing tread and the cap tread, and the like readily occur. In particular, to ensure performance on ice and performance on snow, generally a studless tire is given a block pattern with multiple sipes and a deep groove depth. Also, to ensure block rigidity, the gauge of the undertread is set thicker than that of summer tires. Thus, separation and step wear such as that described above tends to be generated.

To ensure performance on ice and electrostatic suppression performance and also to suppress separation and step wear at the block road contact surface, the pneumatic tire 1 has the following configuration.

The cap tread 151 is made from a rubber material with a volume resistivity of $1 \times 10^{10}$ Ω·cm or greater. For the cap tread 151, for example, an insulating rubber material is used that contains 65 parts by weight or greater of silica blended with 100 parts by weight of a rubber base material and 30 parts by weight or less of carbon black, preferably 10 parts by weight or less of carbon black, and more preferably substantially no carbon black. Note that the rubber base material may be produced from, for example, one kind of diene rubber such as natural rubber (NR), styrene-butadiene rubber (SBR), butadiene rubber (BR), isoprene rubber (IR) or a combination of two or more kinds. Additionally, for example, sulfur, a vulcanization accelerator, an anti-aging agent, and other known additives may also be added.

The volume resistivity is measured in accordance with the method specified in JIS (Japanese Industrial Standard)-K6271 "Rubber, vulcanized or thermoplastic—Determination of volume and/or surface resistivity". Typically, a member with an electric resistivity of less than $1 \times 10^{8}$ Ω·cm can be considered to have electrical conductivity sufficient to suppress a buildup of static electricity.

A modulus M_cap at 300% elongation of the cap tread 151 is preferably in the range 3.0 Mpa≤M_cap≤7.0 Mpa and more preferably in the range 4.0 Mpa≤M_cap≤6.0 Mpa. By appropriately setting the modulus M_cap of the cap tread 151 in this manner, the performance on ice of the tire is increased and the wet performance and low rolling resistance of the tire is ensured.

The modulus (strength at break) is measured by a tensile test using a dumbbell-shaped test piece at a temperature of 20° C. in accordance with JIS-K6251 (using No. 3 dumbbell).

The value R_cap of carbon black volume fraction×dibutyl phthalate oil absorption number/100 for the cap tread 151 is preferably in the range $5 \leq R\_cap \leq 15$ and more preferably in the range $7 \leq R\_cap \leq 10$. By appropriately setting the modulus value R_cap of the cap tread 151 in this manner, the performance on ice of the tire is ensured.

The carbon black volume fraction is defined as the proportion of the volume of a carbon black to the total volume of all components in the mixture. The dibutyl phthalate oil absorption number is defined as the amount of dibutyl phthalate that carbon black can absorb and is measured in accordance with Oil Absorption Method A of JIS-K6217-4.

The rubber hardness H_cap of the cap tread 151 is preferably in the range $45 \leq H\_cap \leq 70$ and more preferably in the range $46 \leq H\_cap \leq 55$. Accordingly, the rubber hardness H_cap of the cap tread 151 is set in a range lower than that of a typical summer tire. By appropriately setting the rubber hardness H_cap of the cap tread 151 in this manner, the performance on ice and performance on snow of the tire is increased and the wet performance and low rolling resistance of the tire is ensured.

Herein, the rubber hardness is measured as JIS-A hardness in accordance with JIS-K6253.

The loss tangent tan δ_cap of the cap tread 151 is preferably in the range $0.05 \leq \tan \delta\_cap \leq 0.30$ and more preferably in the range $0.12 \leq \tan \delta\_cap \leq 0.20$. By appropriately setting the loss tangent tan δ_cap of the cap tread 151 in this manner, the wet performance and low rolling resistance of the tire is ensured.

The loss tangent tan δ is measured using a viscoelastic spectrometer available from Toyo Seiki Seisaku-sho, Ltd., under conditions of a temperature of 60° C., a shear strain of 10%, an amplitude of ±0.5%, and a frequency of 20 Hz.

The undertread 152 is made from a rubber material with a volume resistivity of $1 \times 10^7$ Ω·cm or less. By the undertread 152 having such low resistivity, an electrically conductive path from the belt layer 14 through the undertread 152 to the earthing tread 7 is ensured. This undertread 152, for example, is produced by blending 40 parts by weight or greater of carbon black and preferably from 45 to 70 parts by weight with 100 parts by weight of a diene rubber base material. To increase electrical conductivity, for example, an electrostatic suppression agent, an electrical conductive plasticizer, a metal salt, and other conductive agents may be added.

A modulus M_ut at 300% elongation of the undertread 152 is preferably in the range $10.0 \text{ Mpa} \leq M\_ut \leq 20.0 \text{ Mpa}$ and more preferably in the range $13.0 \text{ Mpa} \leq M\_ut \leq 18.0$ Mpa. Accordingly, the modulus M_ut of the undertread 152 is greater than the modulus M_cap of the cap tread 151. Specifically, the modulus M_cap of the cap tread 151 and the modulus M_ut of the undertread 152 have the relationship $7.0 \text{ Mpa} \leq M\_ut - M\_cap \leq 14.0$ Mpa.

The value R_ut of carbon black volume fraction×dibutyl phthalate oil absorption number/100 for the undertread 152 is preferably in the range $15 \leq R\_ut \leq 35$ and more preferably in the range $16 \leq R\_ut \leq 25$. The value R_ut of the undertread 152 is greater than the value R_cap of the cap tread 151. Specifically, the value R_cap of the cap tread 151 and the value R_ut of the undertread 152 have the relationship $5 \leq R\_ut - R\_cap \leq 18$.

The rubber hardness H_ut of the undertread 152 is preferably in the range $53 \leq H\_ut \leq 78$ and more preferably in the range $55 \leq H\_ut \leq 70$. The rubber hardness H_ut of the undertread 152 is greater than the rubber hardness H_cap of the cap tread 151. Specifically, the rubber hardness H_cap of the cap tread 151 and the rubber hardness H_ut of the undertread 152 have the relationship $5 \leq H\_ut - H\_cap \leq 25$. In this way, the undertread 152 appropriate ensures the rigidity of the blocks 5.

The loss tangent tan δ_ut of the undertread 152 is preferably in the range $0.03 \leq \tan \delta\_ut \leq 0.25$ and more preferably in the range $0.10 \leq \tan \delta\_ut \leq 0.15$. The loss tangent tan δ_ut of the undertread 152 is less than the loss tangent tan δ_cap of the cap tread 151. Specifically, the loss tangent tan δ_cap of the cap tread 151 and the loss tangent tan δ_ut of the undertread 152 have the relationship $0.01 \leq \tan \delta cap - \tan \delta\_ut$ and more preferably the relationship $0.02 \leq \tan \delta cap - \tan \delta\_ut$. In such a configuration, using the undertread 152 with low heat build-up suppresses separation at the contact portions between the undertread 152 and the cap tread 151 and also between the undertread 152 and the belt layer 14.

The cord rubber of the carcass layer 13, the coating rubber of the belt plies 141 to 143 of the belt layer 14, and the rim cushion rubbers 17 are made from a rubber material with a volume resistivity of $1 \times 10^7$ Ω·cm or less.

The earthing tread 7 is an electrically conductive rubber member that extends through the cap tread 151 and is exposed on the tread contact surface. The earthing tread 7 constitutes an electrically conductive path from the tire interior to the road surface.

The earthing tread 7 is made from a rubber material with an electric resistivity lower than that of the cap tread 151. Specifically, the earthing tread 7 is preferably made from a rubber material with a volume resistivity of $1 \times 10^7$ Ω·cm or less. This earthing tread 7, for example, is produced by blending 40 parts by weight or greater of carbon black and preferably from 45 to 70 parts by weight with 100 parts by weight of a diene rubber base material. To increase electrical conductivity, for example, an electrostatic suppression agent, an electrical conductive plasticizer, a metal salt, and other conductive agents may be added.

A modulus M_ea at 300% elongation of the earthing tread 7 is preferably in the range $10.0 \text{ Mpa} \leq M\_ea \leq 20.0 \text{ Mpa}$ and more preferably in the range $13.0 \text{ Mpa} \leq M\_ea \leq 18.0$ Mpa. Accordingly, the modulus M_ea of the earthing tread 7 is greater than the modulus M_cap of the cap tread 151. As a result, the block rigidity of the blocks 5 appropriately ensured. Specifically, the modulus M_cap of the cap tread 151 and the modulus M_ea of the earthing tread 7 have the relationship $7.0 \text{ Mpa} \leq M\_ea - M\_cap \leq 14.0$ Mpa.

The value R_ea of carbon black volume fraction×dibutyl phthalate oil absorption number/100 for the earthing tread 7 is preferably in the range $15 \leq R\_ea \leq 35$ and more preferably in the range $16 \leq R\_ea \leq 25$. The value R_ea of the earthing tread 7 is greater than the value R_cap of the cap tread 151. Specifically, the value R_cap of the cap tread 151 and the value R_ea of the earthing tread 7 have the relationship $5 \leq R\_ea - R\_cap \leq 18$.

The rubber hardness H_ea of the earthing tread 7 is preferably in the range $53 \leq H\_ea \leq 78$ and more preferably in the range $55 \leq H\_ea \leq 70$. The rubber hardness H_ea of the earthing tread 7 is greater than the rubber hardness H_cap of the cap tread 151. Specifically, the rubber hardness H_cap of the cap tread and the rubber hardness H_ea of the earthing tread 7 have the relationship $5 \leq H\_ea - H\_cap \leq 25$.

The loss tangent tan δ_ea of the earthing tread 7 is preferably in the range $0.03 \leq \tan δ\_ea \leq 0.25$ and more preferably in the range $0.10 \leq \tan δ\_ea \leq 0.15$. The loss tangent tan δ_ea of the earthing tread 7 is less than the loss tangent tan δ_cap of the cap tread 151. Specifically, the loss tangent tan δ_cap of the cap tread 151 and the loss tangent tan δ_ea of the earthing tread 7 have the relationship $0.01 \leq \tan δ\_cap - \tan δ\_ea$ and more preferably the relationship $0.02 \leq \tan δ\_cap - \tan δ\_ea$. In such a configuration, using the earthing tread 7 (and the undertread 152) with low heat build-up suppresses separation at the contact portion between the earthing tread 7 and the cap tread 151.

In the configuration described above, static electricity generated in the vehicle, when traveling, is discharged from a rim 10, through the rim cushion rubbers 17 and the carcass layer 13, to the belt layer 14, then from the belt layer 14, through the undertread 152 and the earthing tread 7 to the road surface. This prevents the vehicle from having a charge. As the rim cushion rubbers 17, the coating rubber of the carcass layer 13 and the coating rubber of the belt layer 14 form an electrically conductive path, these components preferably have a low electric resistivity.

In the pneumatic tire 1, the earthing tread 7 is made from the same rubber material as the undertread 152. Thus, the earthing tread 7 has the same physical properties as the undertread 152. In the manufactured tire after vulcanization molding, the earthing tread 7 has an integral structure with the undertread 152. For example, the earthing tread 7 and the undertread 152 may be formed from a single piece of unvulcanized rubber formed in a predetermined shape or may be formed from a plurality of separate unvulcanized rubber pieces.

The boundary between the earthing tread 7 and the undertread 152 in a manufactured tire is not strictly defined, but can be generally understood as follows. In a cross-sectional view in the tire meridian direction, the undertread 152 can be understood as a base rubber with a broad width that is inserted between the cap tread 151 and the belt layer 14 and extends across the entire tread region. The earthing tread 7 can be understood as a rubber portion with a narrow width that projects in a branch-like manner from the undertread 152 toward the block road contact surface and is exposed on the block road contact surface. The connection portion between the broad base rubber and the narrow rubber portion can be understood as the boundary between the earthing tread 7 and the undertread 152. A typical earthing tread 7 has an overall narrow rectangular or trapezoidal shape. Additionally, at the connection portion with the undertread 152, the earthing tread 7 gradually widens as it extends towards the undertread 152 (see FIG. 3 described below).

As described above, in a configuration in which the rubber material of the cap tread 151 and the rubber material of the earthing tread 7 differ greatly in terms of physical properties, separation at the boundary face between the earthing tread and the cap tread, step wear between the earthing tread and the cap tread, and the like readily occur. In particular, to ensure performance on ice and performance on snow, generally a studless tire is given a block pattern with multiple sipes and a deep groove depth. Also, to ensure block rigidity, the gauge of the undertread 152 is set thicker than that of summer tires. Thus, separation and step wear such as that described above tends to be generated.

On this point, in the configuration described above, the earthing tread 7 and the undertread 152 have an integral structure made from the same rubber material. This suppresses separation caused by a difference in rigidity between members and effectively suppresses separation at the block road contact surface.

Thickened Portion of Undertread

Figure 3:
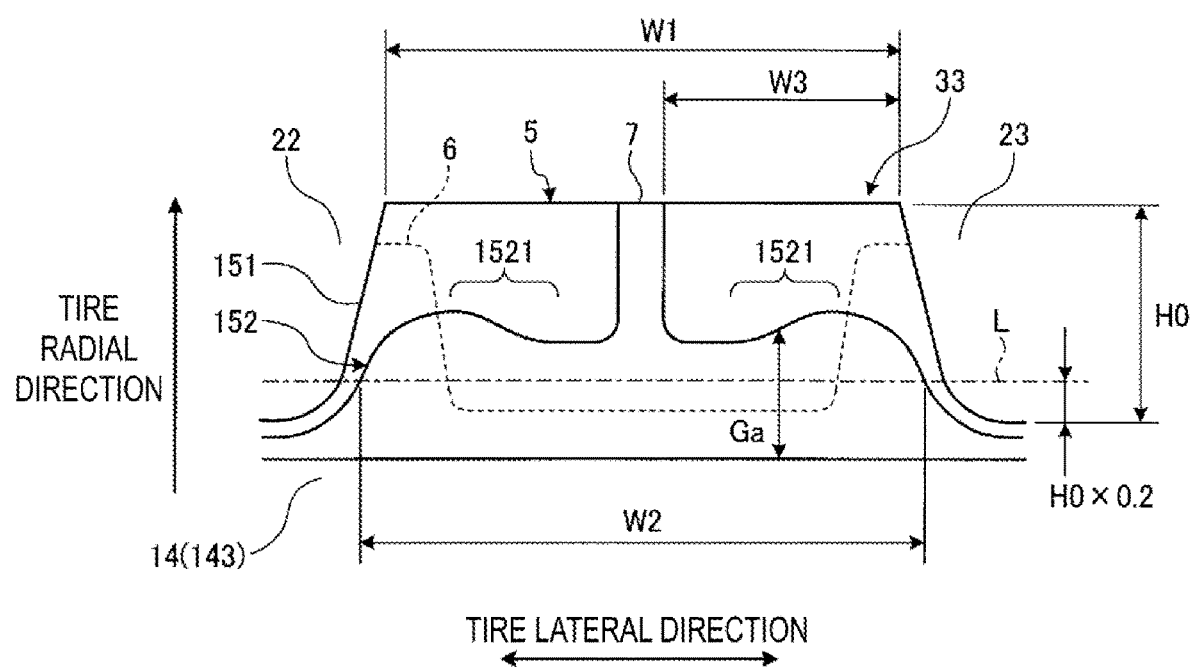
FIG. 3 is an explanatory diagram illustrating the internal structure of the block illustrated in FIG. 2.
Figure 4:
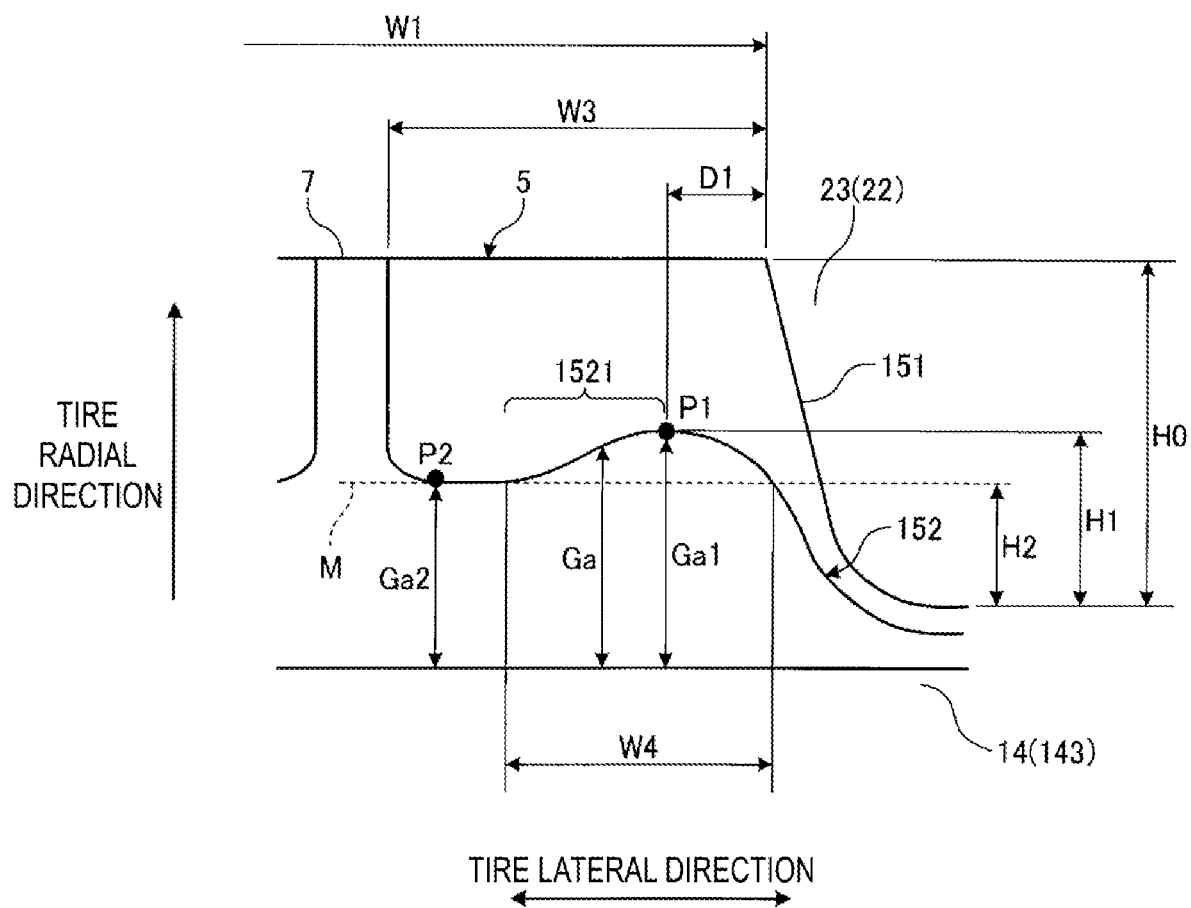
FIG. 4 is an explanatory diagram illustrating the internal structure of the block illustrated in FIG. 2.
Figure 5:
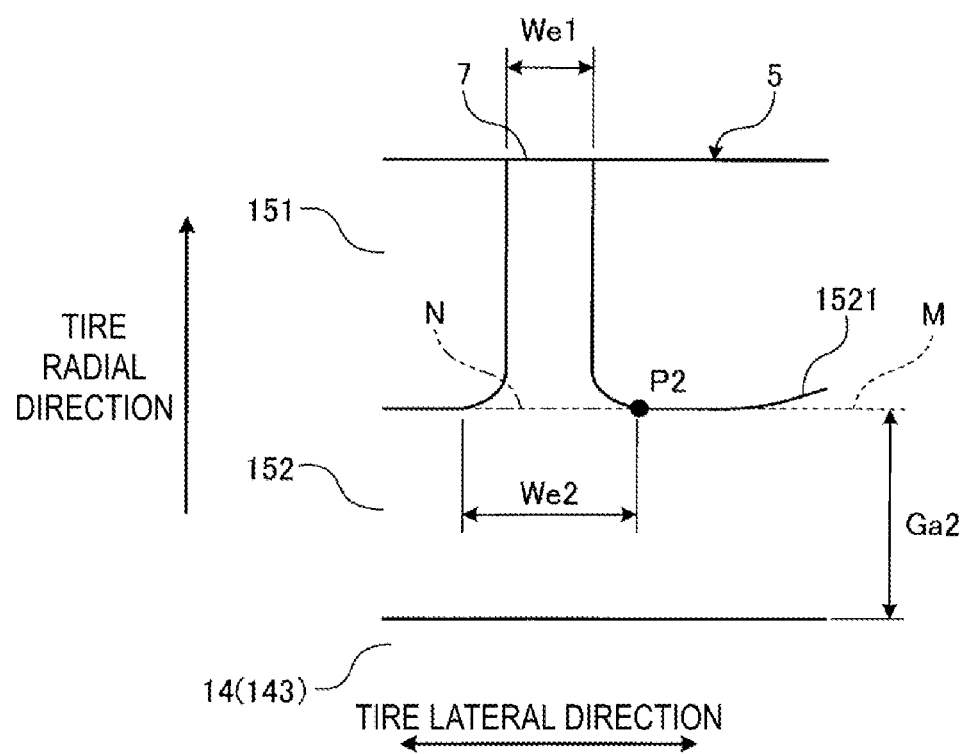
FIG. 5 is an explanatory diagram illustrating the internal structure of the block illustrated in FIG. 2.

FIGS. 3 to 5 are explanatory diagrams illustrating the internal structure of the block illustrated in FIG. 2. FIG. 3 is a cross-sectional view in a tire meridian direction of the block 5 of the center land portion 33 illustrated in FIG. 2. FIGS. 4 and 5 are enlarged views of a main portion of the block illustrated in FIG. 3.

The pneumatic tire 1 employs a block pattern generally used for studless tires. By the blocks 5 each including a plurality of sipes 6 (see FIG. 2), the performance on ice and performance on snow of the tire is increased.

For example, in the configuration of FIG. 2, the block 5 of the center land portion 33 (see FIG. 1), have a rectangular or parallelogram shape elongated in the tire circumferential direction. The blocks 5 each include a plurality of sipes 6 extending substantially in the tire lateral direction.

The earthing tread 7 extends through the cap tread 151 and exposed on the road contact surface of the block 5 of the center land portion 33 (see FIG. 1), and also has an annular structure that extends continuously around the entire circumference of the tire. The earthing tread 7 may be disposed at a position away from the tire equatorial plane CL or may be disposed on the tire equatorial plane CL. As illustrated in FIG. 2, the earthing tread 7 extends through the block 5 in the tire circumferential direction. Accordingly, the earthing tread 7 is configured to be in constant contact with the road surface when the tire is in contact with the ground.

As illustrated in FIG. 3, the gauge of the undertread 152 is set to a value greater than that of a typical summer tire. In other words, the boundary face between the cap tread 151 and the undertread 152 is located further outward in the tire radial direction than a maximum groove depth position of the main grooves 22, 23 in the ground contact region of the block 5. Additionally, as described above, the rubber hardness H_ut of the undertread 152 is greater than the rubber hardness H_cap of the cap tread 151. Thus, a decrease in block rigidity caused by employing a block pattern is suppressed.

Specifically, in a cross-sectional view in the tire meridian direction, a line running parallel with the road contact surface of the block 5 through a point 20% of a maximum groove depth H0 of the main groove 23 from the maximum groove depth position of the main grooves 22, 23 is defined as an imaginary line L (the dot-dash line in the drawing). In a case in which the groove depths of the left and right main grooves 22, 23 of the block 5 differ, the imaginary line L is defined in reference to the maximum groove depth H0 of the deeper main groove. In such a case, a width W1 of all of the road contact surface of the block 5 and a total width W2 of the portion of the undertread 152 projecting outward in the tire radial direction beyond the imaginary line L preferably have the relationship $0.60 \leq W2/W1$ and more preferably have the relationship $0.70 \leq W2/W1$. The upper limit of the ratio W2/W1 in not particularly limited, but is subject to restrictions depending on the width of the block 5 at a position 20% of the maximum groove depth H0.

The maximum groove depth H0 of the main grooves 21 to 23 are preferably in the range $6.5 \text{ mm} \leq H0$, and more preferably in the range $7.5 \text{ mm} \leq H0$. Accordingly, the depth of the main grooves 21 to 23 is deeper than that of a typical summer tire. The upper limit of H0 is not particularly limited, but is subject to restrictions in relation to the tread gauge as the groove bottom of the main groove 23 is required to not reach the belt layer 14.

The width W1 of all of the ground contact region of the block 5 is measured as the width of the ground contact region of the block, when the tire is mounted on a specified rim, inflated to the specified internal pressure, and in an unloaded state.

The ground contact region of the block 5 is defined at a contact surface between a tire and a flat plate when the tire is mounted on a specified rim, inflated to the specified internal pressure, placed vertically on the flat plate in a static state, and loaded with a load corresponding to the specified load.

In a configuration in which a plurality of portions of the undertread 152 project beyond the imaginary line L, the total width W2 of the portion of the undertread 152 is calculated by finding the sum of the widths of each portion.

As illustrated in FIG. 3, the undertread 152 including a thickened portion 1521 is a region between the earthing tread 7 and one of the edge portions of the block 5. A gauge Ga of the undertread 152 gradually increases from the earthing tread 7 toward one of the edge portions of the block 5 due to the thickened portion 1521. Concurrently, a gauge (dimension symbol omitted in drawings) of the cap tread 151 gradually decreases from the earthing tread 7 toward one of the edge portions of the block 5.

The gauge Ga of the undertread 152, in a cross-sectional view in the tire meridian direction, is measured as the thickness of the undertread 152 in the groove depth direction of the main grooves 22, 23 (i.e., height direction of the block 5). The gauge Ga of the undertread 152 is defined for respective regions on the left and the right of the earthing tread 7. In the configuration of FIG. 3, as described above, the undertread 152 and the earthing tread 7 have an integral structure such that a distinct boundary face does not exist between the two. Thus, the gauge Ga of the undertread 152 cannot be defined at the connection portion between the undertread 152 and the earthing tread 7.

For example, in the configuration of FIG. 3, in a cross-sectional view in the tire meridian direction, the undertread 152 has a generally left-right symmetrical structure centered on the earthing tread 7. The earthing tread 7 extends from the road contact surface of the block 5 inward in the tire radial direction and connects with the undertread 152. The earthing tread 7 increases in width, with the base widening at the connection portion with the undertread 152, and smoothly connects with the undertread 152. As such, the boundary line between the cap tread 151 and the earthing tread 7 and the undertread 152 is smoothly curved from the road contact surface of the block 5 inward in the tire radial direction.

Additionally, the undertread 152 includes the thickened portions 1521, 1521 in regions between the earthing tread 7 and the left and right edge portions of the block 5. The thickened portion 1521 includes a top surface with an arc shape that projects outward in the tire radial direction. The exposed portion of the earthing tread 7 on the block road contact surface and a maximum projection portion of the thickened portion 1521 are located at different positions in the block width direction. The boundary line between the cap tread 151 and the undertread 152 has a shape smoothly recessed inward in the tire radial direction between the earthing tread 7 and the thickened portion 1521 and also partially includes a region parallel with the road contact surface of the block 5. The undertread 152 has a square-shoulder shape protruding outward in the tire radial direction on the left and right side of the earthing tread 7.

The undertread 152 gradually decreases in thickness from the maximum projection position of the thickened portion 1521 toward the left and right edge portions of the block 5 and reaches the circumferential main grooves 22 (23). Thus, the outer circumferential surface of the undertread 152 (i.e., the boundary face with the cap tread 151) is curved in a gentle S-shape from the thickened portion 1521 toward the groove bottom of the circumferential main groove 22 (23). Additionally, at the groove walls and the groove bottoms of the circumferential main grooves 22, 23, the cap tread 151 is exposed but the undertread 152 is not exposed.

As illustrated in FIG. 4, in a region between the earthing tread 7 and the edge portion of the block 5, a point P1 is defined on the outer circumferential surface of the undertread 152 where the gauge Ga of the undertread 152 is a maximum value Ga1. In the tire ground contact region, the inner circumferential surface of the undertread 152 (herein, the boundary face between the undertread 152 and the outermost layer of the belt layer 14 (belt cover 143)) is substantially parallel with the road contact surface of the block 5. Thus, the point P1 is located at the top portion of the thickened portion 1521. The gauge of the cap tread 151 in the ground contact region of the block 5 is the lowest value at the point P1.

In a region between the earthing tread 7 and the point P1, a point P2 is defined on the outer circumferential surface of the undertread 152 where the gauge Ga of the undertread 152 is a minimum value Ga2. The point P2 is located at or near the base of the earthing tread 7 in the block 5, or in other words, at or near the connection portion between the earthing tread 7 and the undertread 152.

For example, in the configuration of FIG. 4, the gauge Ga of the undertread 152 changes in the following manner from the earthing tread 7 toward the circumferential main groove 23 (22). Firstly, the gauge Ga of the undertread 152 has the local minimum value (the minimum value Ga2 described above) at the point P2 at or near the connection portion between the earthing tread 7 and the undertread 152. Thus, examining the block road contact surface reveals that the gauge Ga of the undertread 152 is at the local minimum value at or near the position where the earthing tread 7 is exposed and the gauge of the cap tread 151 is at the local maximum value. Next, the gauge Ga of the undertread 152 monotonously and gently increases from the point P2 toward the edge portion of the block 5 and has the local maximum value (the maximum value Ga1 described above) at or near the edge portion of the block 5. Then, the gauge Ga of the undertread 152 monotonously decreases from the point P1 toward the groove bottom of the circumferential main groove 23 (22) and has the minimum value at the groove bottom of the circumferential main groove 23 (22).

In the configuration of FIG. 3, as described above, the earthing tread 7 is made from the same rubber material as the undertread 152. The earthing tread 7 is exposed on the road contact surface of the block 5 and extends in the tire circumferential direction (see FIG. 2). The rubber material of the cap tread 151 and the rubber material of the earthing tread 7 differing greatly in terms of physical properties causes separation at the boundary face between the earthing tread 7 and the cap tread 151, step wear between the earthing tread 7 and the cap tread 151, and the like to readily occur. For example, the modulus of the earthing tread 7 being greater than the modulus of the cap tread 151 tends to increase ground contact pressure at the exposed portion of the earthing tread 7 when the block 5 comes into contact with the ground and cause step wear between the earthing tread 7 and the cap tread 151.

On this point, in the configuration of FIG. 3, the undertread 152 includes the thickened portion 1521 in the region between the earthing tread 7 and the edge portion of the block 5, and the gauge Ga of the undertread 152 gradually increases from the earthing tread 7 toward one of the edge portions of the block 5 (see FIG. 4). Additionally, in a relative manner, the gauge (dimension symbol omitted in drawings) of the cap tread 151 gradually decreases from the earthing tread 7 toward one of the edge portions of the block 5. Generally, the earthing tread 7 has a higher modulus than the cap tread 151. Thus, the contact pressure distribution in the ground contact region of the block 5 tends to be high at the position where the earthing tread 7 is disposed and low in other ground contact regions. In the configuration described above, the gauge Ga of the undertread 152 gradually increases from the earthing tread 7 toward one of the edge portions of the block 5. This makes the ground contact pressure uniform across the block 5. This suppresses the separation and step wear described above at the boundary portion between the earthing tread 7 and the cap tread 151 to be generated.

Additionally, as illustrated in FIG. 4, a distance H1 in the groove depth direction of the circumferential main groove 22 (23) from the maximum depth position of the circumferential main groove 23 (22) to the point P1 (defined as the point where the gauge Ga of the undertread 152 is the maximum value Ga1) and the maximum groove depth H0 of the circumferential main groove 23 (22) preferably have the relationship $H1/H0 \leq 0.50$ and more preferably have the relationship $H1/H0 \leq 0.40$. In this way, the gauge Ga of the thickened portion 1521 of the undertread 152 is appropriately ensured, and the difference in ground contact pressure at the block road contact surface at the boundary portion between the earthing tread 7 and the cap tread 151 is made uniform. Note that the lower limit ratio H1/H0 is not particularly limited, but is subject to restrictions in relation to other conditions.

Additionally, a distance H2 in the groove depth direction of the circumferential main groove 22 (23) from the maximum depth position of the circumferential main groove 23 (22) to the point P2 (defined as the point where the gauge Ga of the undertread 152 in the region between the earthing tread 7 and the point P1 is the minimum value Ga2) and the maximum groove depth H0 of the circumferential main groove 23 (22) preferably have the relationship $0.20 \leq H2/H0$ and more preferably have the relationship $0.30 \leq H2/H0$. In this way, the gauge Ga of the undertread 152 between the earthing tread 7 and the thickened portion 1521 is appropriately reduced, and the difference in ground contact pressure at the block road contact surface at the boundary portion between the earthing tread 7 and the cap tread 151 is made uniform. Note that the upper limit of the ratio H2/H0 is not particularly limited, but is subject to restrictions in relation to other conditions.

The distances H1, H2 are measured when the tire is mounted on a specified rim, inflated to the specified internal pressure, and in an unloaded state.

Additionally, the maximum value Ga1 of the gauge Ga of the undertread 152 in the region between the earthing tread 7 and the edge portion of the block 5 and the minimum value Ga2 of the gauge Ga of the undertread 152 in the region between the earthing tread 7 and the point P1 preferably have the relationship $0.5 \text{ mm} \leq Ga1-Ga2 \leq 3.0 \text{ mm}$ and more preferably have the relationship $1.0 \text{ mm} \leq Ga1-Ga2 \leq 2.0 \text{ mm}$. In this way, the protrusion amount (gauge difference Ga1−Ga2) of the thickened portion 1521 of the undertread 152 can be appropriately set.

Additionally, width W3 (W31, W32) of the road contact surface of the block 5 in the region between the earthing tread 7 and the left and right edge portions of the block 5 and the width W1 (see FIG. 3) of all of the road contact surface of the block 5 preferably have the relationship $0.20 \leq W3/W1$ and more preferably $0.30 \leq W3/W1$. In this way, the distance from the earthing tread 7 to the edge portion of the block 5 can be ensured, and the thickened portion 1521 of the undertread 152 can be appropriately formed. The upper limit of the ratio W3/W1 is not particularly limited, but it is subject to restrictions depending on the positional relationship between the earthing tread 7 and the left and right edge portions of the block 5 and the width of the earthing tread 7.

A distance D1 in the tire lateral direction from the point P1 to the edge portion in the block 5 and the width W3 of the road contact surface of the block 5 in the region between the earthing tread 7 and the edge portion of the block 5 preferably have the relationship $0.02 \leq D1/W3 \leq 0.25$ and more preferably have the relationship $0.05 \leq D1/W3 \leq 0.20$. In this way, the position of the point P1 where the gauge Ga of the undertread 152 is the maximum is appropriately set.

A width W4 of the thickened portion 1521 of the undertread 152 and the width W3 of the road contact surface of the block 5 in the region between the earthing tread 7 and the edge portion of the block 5 preferably have the relationship $0.30 \leq W4/W3 \leq 0.70$ and more preferably have the relationship $0.50 \leq W4/W3 \leq 0.60$. In this way, the width W4 of the thickened portion 1521 is appropriately set.

The width W4 of the thickened portion 1521 is measured in according with the following definitions. As illustrated in FIG. 4, in a cross-sectional view in the tire meridian direction, a line running parallel with the road contact surface of the block 5 through the point P2 where the gauge Ga of the undertread 152 is the local minimum is defined as an imaginary line M (the dashed line in the drawing). The width W4 is defined as the maximum width of the portion of the outer circumferential surface of the undertread 152 that projects toward the road contact surface of the block 5 beyond the imaginary line M. Note that the point P1 where the gauge of the undertread 152 is the local maximum value is included in the portion of the outer circumferential surface of the undertread 152 defined by the imaginary line M.

As illustrated in FIG. 5, a width We1 of the earthing tread 7 at the road contact surface of the block 5 and a width We2 of the earthing tread 7 at the connection portion with the undertread 152 have the relationship $We1 \leq We2$. The width We1 is preferably in the range $0.5 \text{ mm} \leq We1 \leq 5.0 \text{ mm}$ and the width We2 is preferably in the range $1.0 \text{ mm} \leq We2 \leq 10.0 \text{ mm}$. In this way, the width of the earthing tread 7 is appropriately set. For example, in the case of $We1 \leq 0.5 \text{ mm}$, there may be a decrease in the electrical conductivity of the earthing tread 7. In the case of $5.0 \text{ mm} \leq We1$, the ground contact area of the cap tread 151 is reduced and the dry performance and wet performance of the tire is reduced, which is not preferable.

The width We1 is measured as the width in the tire lateral direction of the exposed portion of the earthing tread 7 at the road contact surface of the block 5.

The width We2 is measured in the following manner. Firstly, as illustrated in FIG. 5, in a cross-sectional view in the tire meridian direction, the point P2 is defined as the point where the gauge of the undertread 152 is the local minimum value Ga2. The line running parallel with the road contact surface of the block 5 through the point P2 is defined as an imaginary line N (two-dot chain line in the drawing). Alternatively, in a case in which the point P2 is located in both of the left and right regions of the earthing tread 7 (i.e., as illustrated in FIG. 3, when the thickened portion 1521 is located to the left and the right of the earthing tread 7), the imaginary line N is defined as the straight line connecting the left and right points P2. Additionally, the length in the tire lateral direction of the imaginary line N that meets the earthing tread 7 and the undertread 152 is measured as the width We2.

Block Sipe

As illustrated in FIG. 2, the block 5 includes a plurality of sipes 6. These sipes 6 extend in the tire lateral direction through the earthing tread 7 in the road contact surface of the block 5.

As described above, in a configuration in which the earthing tread 7 and the cap tread 151 differ greatly in terms of physical properties, the difference in ground contact pressure acting on both when the tire comes into contact with the ground increases and separation and step wear tend to occur at the boundary between the two. On this point, in the configuration described above, as the sipes 6 extend through the earthing tread 7 in the road contact surface of the block 5, the difference in ground contact pressure between the earthing tread 7 and the cap tread 151 is alleviated. This suppresses the separation and step wear described above to be generated.

For example, in the configuration of FIG. 2, the earthing tread 7 is exposed on the road contact surface of the block 5 and extends through the block 5 in the tire circumferential direction. Additionally, the plurality of sipes 6 extend substantially in the tire lateral direction and are arranged spaced at predetermined intervals in the tire circumferential direction. The plurality of sipes 6 disposed in the central region of the block 5 in the tire circumferential direction have an open structure, with the sipes opening to the left and right edge portions of the block 5. The pair of sipes 6 disposed at the front and back in the tire circumferential direction have a closed structure, with the sipes terminating within the block. Each sipe 6 has a zigzag shape with amplitude in the tire circumferential direction. Additionally, each sipe 6 extends through the earthing tread 7 in the tire lateral direction at the road contact surface of the block 5.

As illustrated in FIG. 3, the bottom portion of the sipe 6 and the boundary face between the cap tread 151 and the undertread 152 are disposed offset from one another in the tire radial direction. This offset amount is preferably 1.0 mm or greater.

In a configuration in which the bottom portion of the sipe 6 and the boundary face between the cap tread 151 and the undertread 152 has the same position, cracking originating from the bottom portion of the sipe 6 tend to be generated. On this point, in the configuration described above, as the bottom portion of the sipe 6 and the boundary face between the cap tread 151 and the undertread 152 are disposed offset from one another in the tire radial direction, the cracking described above is suppressed to be generated.

For example, in the configuration of FIG. 3, the sipes 6 with an open structure each include a raised bottom portion (reference sign omitted in drawings) at the opening portions to the left and right edge portions of the block 5. Accordingly, the depth of the sipe 6 is deep at the central portion of the block 5 in the tire lateral direction and shallow at the left and right edge portions of the block 5. The maximum depth (dimension symbol omitted in drawings) of the sipe 6 is 80% or greater than the maximum groove depth H0 of the circumferential main groove 23. Thus, the maximum depth position of the sipe 6 is located further inward in the tire radial direction than the imaginary line L. Also, in the central portion of the block 5, the maximum depth position of the sipe 6 is located further inward in the tire radial direction than the boundary face between the cap tread 151 and the undertread 152 and is located inside the undertread 152. Furthermore, as described above, the sipe 6 extends through the earthing tread 7 in the tire lateral direction and, as illustrated in FIG. 3, extends through the earthing tread 7 in the tire radial direction.

Narrow Shallow Groove of Block

As illustrated in FIG. 2, the block 5 includes a plurality of narrow shallow grooves 8 that extend through the earthing tread 7 in the tire lateral direction in the block road contact surface. The plurality of narrow shallow grooves 8 are disposed in the entire region of the block road contact surface. The narrow shallow grooves 8 are each formed by using surface processing on the block road contact surface and have a groove width of from 0.2 mm to 0.7 mm and a groove depth of from 0.2 mm to 0.7 mm. Accordingly, the narrow shallow groove 8 is extremely shallow compared to the sipe 6. The narrow shallow groove 8 may have a discretionary shape such as a linear shape, wave-like shape, arc shape, or the like. The narrow shallow groove 8 may open to the left and right edge portions of the block 5 by traversing the road contact surface of the block 5, or may terminate at one or both end portions within the block 5. Additionally, the plurality of narrow shallow grooves 8 may be disposed in a criss-cross manner.

In such a configuration, by the narrow shallow grooves 8 taking in and removing a water film formed between an icy road surface and the block road contact surface when the tire comes into contact with the ground, the braking performance on ice of the tire is improved. Additionally, as the narrow shallow grooves 8 extend through the earthing tread 7 in the road contact surface of the block 5, the difference in ground contact pressure between the earthing tread 7 and the cap tread 151 is alleviated. This suppresses the separation and step wear described above to be generated.

For example, in the configuration of FIG. 2, the narrow shallow grooves 8 have an elongated linear shape and are disposed inclined in the longitudinal direction with respect to the tire circumferential direction. The narrow shallow grooves 8 extend through the road contact surface of the block 5 and opens to the edge portion of the block 5. The narrow shallow grooves 8 cross the sipes 6 and the earthing tread 7 in the road contact surface of the block 5. The plurality of narrow shallow grooves 8 are disposed side by side at predetermined intervals from one another in the entire region of the road contact surface of the block 5.

Additionally, as described above, in a configuration in which the narrow shallow grooves 8 have a linear shape, an angle θ formed between the longitudinal direction of the narrow shallow grooves 8 and the tire circumferential direction is preferably in the range 20 degrees≤θ≤90 degrees and more preferably in the range 40 degrees≤θ≤60 degrees. The arrangement interval of the narrow shallow grooves 8 preferably ranges from 0.5 mm to 1.5 mm and more preferably ranges from 0.7 mm to 1.2 mm. As a result, the water film removing function of the narrow shallow grooves 8 is appropriately ensured, and the ground contact area of the block 5 is ensured.

Modified Examples

Figure 6:
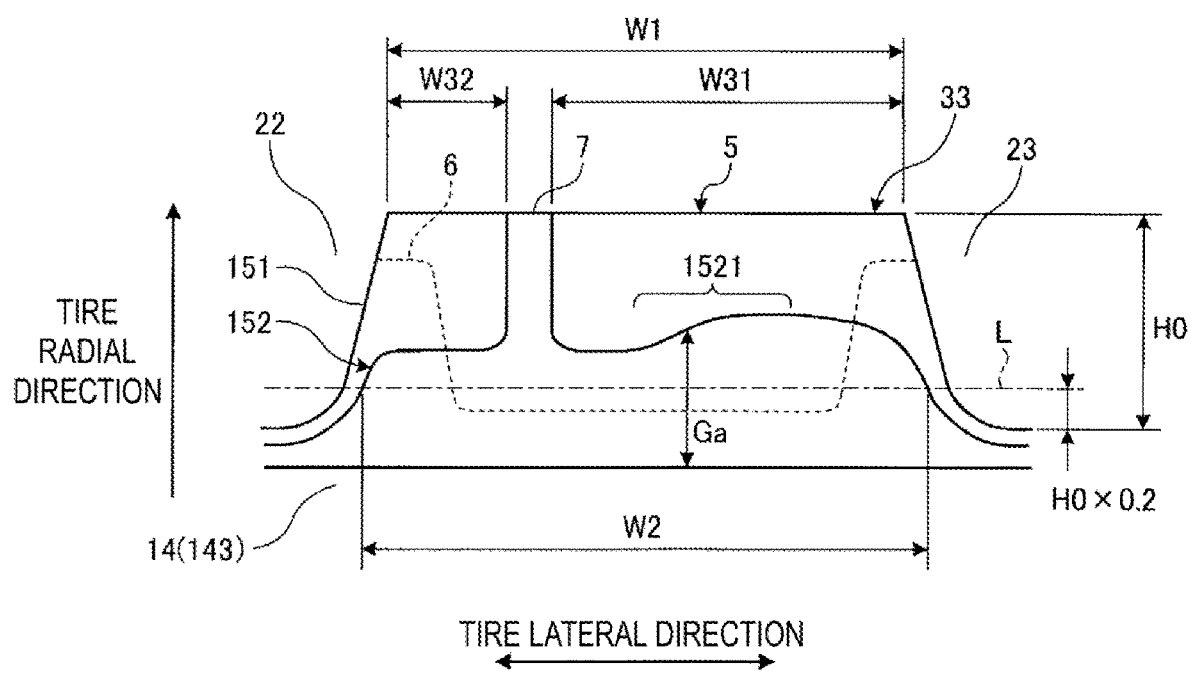
FIG. 6 is an explanatory diagram illustrating a modified example of the block illustrated in FIG. 3.
Figure 7:
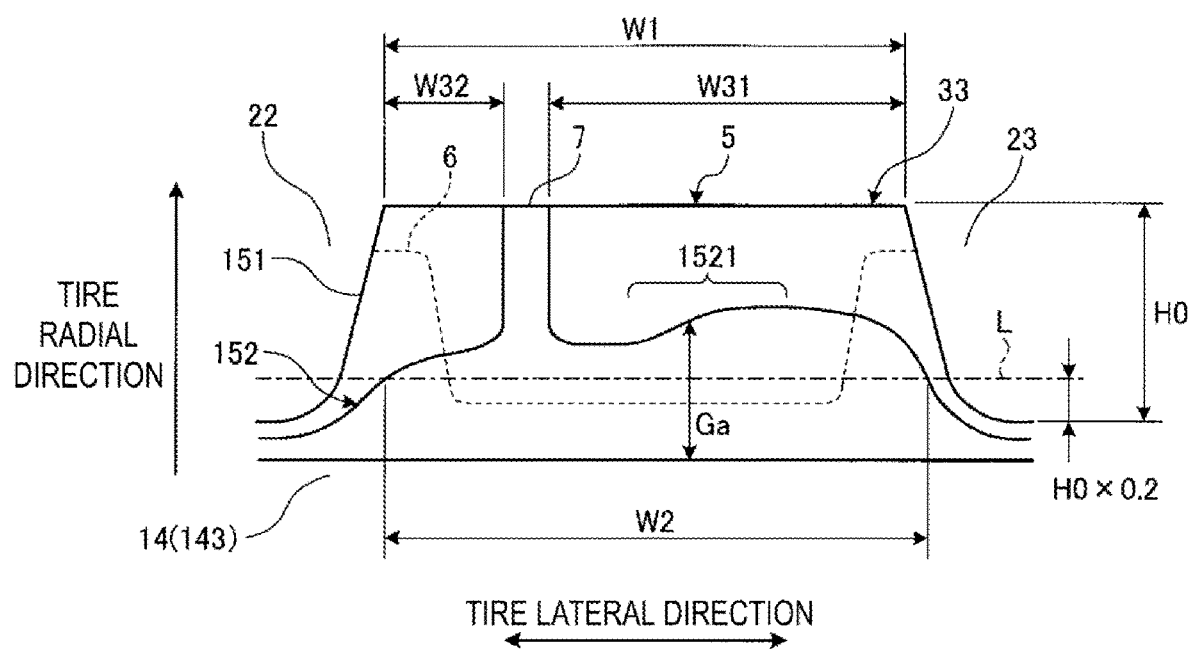
FIG. 7 is an explanatory diagram illustrating a modified example of the block illustrated in FIG. 3.
Figure 8:
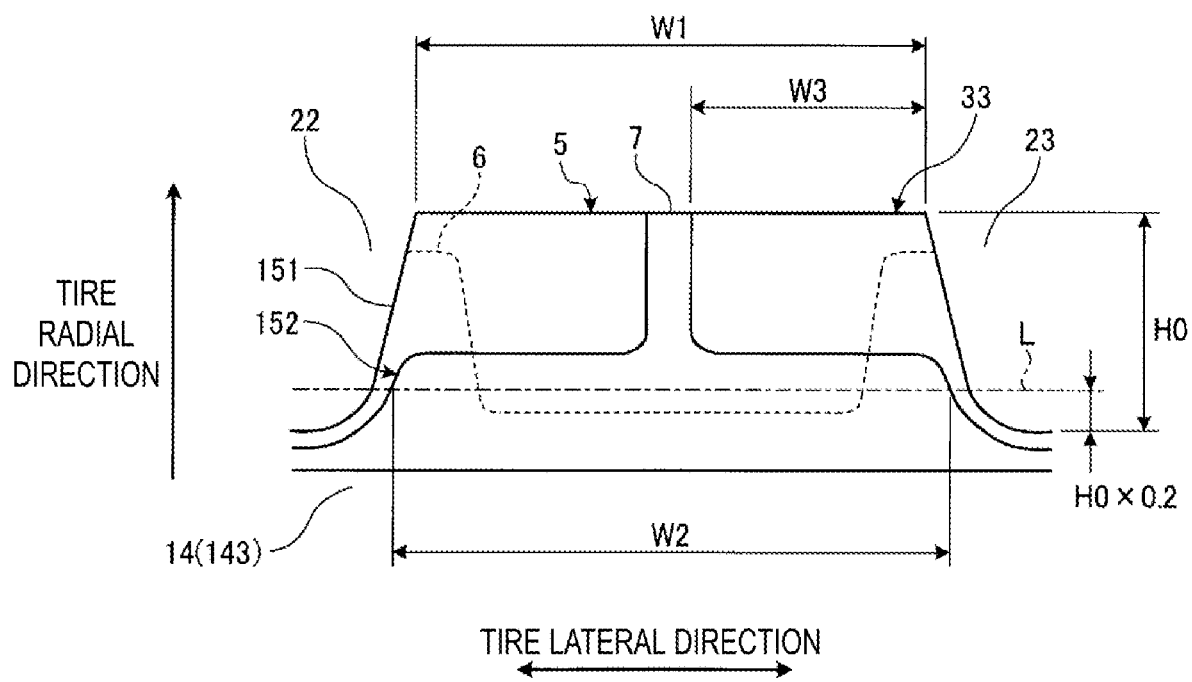
FIG. 8 is an explanatory diagram illustrating a modified example of the block illustrated in FIG. 3.

FIGS. 6 to 8 are explanatory diagrams illustrating modified examples of the block illustrated in FIG. 3. In these drawings, constituents that are the same as those illustrated in FIG. 3 have the same reference signs, and explanations thereof are omitted.

In the configuration of FIG. 3, the earthing tread 7 is disposed in the central portion of the block 5, and the undertread 152 includes the thickened portion 1521 in each of the regions to the left and right of the earthing tread 7.

However, no such limitation is intended, and the earthing tread 7 may be disposed closer to one of the edge portions of the block 5 (see FIGS. 6 and 7). Additionally, the undertread 152 may include the thickened portion 1521 in only one of the regions to the left and right of the earthing tread 7 (see FIGS. 6 and 7) or may not include the thickened portion 1521 (see FIG. 8).

For example, in the configurations of FIGS. 6 and 7, the earthing tread 7 is disposed closer to one of the edge portions (left side in the drawing) of the block 5. Thus, a width W32 of the road contact surface from the earthing tread 7 to one of the edge portions of the block 5 is narrower than that of the configuration of FIG. 3. In the region with the narrow width W32 of the road contact surface, the difference between the earthing tread 7 and the cap tread 151 in terms of the ground contact pressure is decreased, and the separation and step wear described above is suppressed from occurring. Accordingly, the thickened portion 1521 of the undertread 152 may be omitted. In such a case, as illustrated in FIG. 6, in the region with the narrow width W32, the outer circumferential surface of the undertread 152 may include a section parallel with the road contact surface of the block 5, or as illustrated in FIG. 7, the gauge Ga of the undertread 152 may monotonously decrease from the earthing tread 7 toward the edge portion of the block 5.

Additionally, for example, in the configuration of FIG. 8, the undertread 152 is without the thickened portion 1521, and the outer circumferential surface of the undertread 152 includes a section parallel with the road contact surface of the block 5 in each region on the left and right of the earthing tread 7. In such a configuration, by the earthing tread 7 and the undertread 152 having an integral structure made from the same rubber material, separation at the block road contact surface is effectively suppressed.

Effects

As described above, the pneumatic tire 1 includes the carcass layer 13, the belt layer 14 disposed outward of the carcass layer 13 in the tire radial direction, and the tread rubber 15 disposed outward of the belt layer 14 in the tire radial direction. Also, the pneumatic tire 1 includes, in the tread surface, the plurality of main grooves 21 to 23 and the plurality of block 5 defined by the main grooves 21 to 23 (see FIG. 1). The tread rubber 15 includes the cap tread 151 that forms the tread surface, the undertread 152 disposed in the layer below the cap tread 151, and the earthing tread 7 that extends through the cap tread 151 and is exposed on the road contact surface of the block 5 (see FIG. 2). The modulus $M\_cap$ at 300% elongation of the cap tread 151 ranges from 3.0 Mpa to 7.0 Mpa, and the modulus $M\_ut$ at 300% elongation of the undertread 152 ranges from 10.0 Mpa to 20.0 Mpa. Additionally, the earthing tread 7 is made from a rubber material with a volume resistivity of $1\times10^7$ Ω·cm or less. The earthing tread 7 is made from the same rubber material as the undertread 152 and has an integral structure with the undertread 152.

In such a configuration, (1) the tire is provided with the earthing tread 7 having a predetermined volume resistivity to form an electrically conductive path from the tire interior to the block road contact surface. As a result, there is an advantage that the electrostatic suppression performance of the tire is secured.

Additionally, (2) the modulus at 300% elongation of the cap tread 151 ranging from 3.0 Mpa to 7.0 Mpa is advantageous in appropriately setting the modulus $M\_cap$ of the cap tread 151. In other words, by the modulus of the cap tread 151 being 3.0 Mpa or greater, the wet performance and low rolling resistance of the tire is ensured. Also, by the modulus of the cap tread 151 being 7.0 Mpa or less, the performance on ice (in particular, braking performance on ice) of the tire is improved.

Furthermore, (3) in a configuration in which the modulus of the cap tread 151 is within a low range such as that described above, separation may be generated at the boundary face between the cap tread 151 and the earthing tread 7. In particular, to ensure performance on ice and performance on snow, a studless tire includes a block pattern with multiple sipes. Also, to ensure block rigidity, the gauge of the undertread 152 is set thicker than that of summer tires. Thus, separation such as that described above tends to be generated. On this point, in the configuration described above, by the earthing tread 7 and the undertread 152 having an integral structure made from the same rubber material, separation at the boundary face between the earthing tread 7 and the cap tread 151 is effectively suppressed. As a result, there is an advantage that the separation resistance performance of the tire is improved.

In the pneumatic tire 1, the value $R\_cap$ of carbon black volume fraction×dibutyl phthalate oil absorption number/100 for the cap tread 151 is in the range $5 \le R\_cap \le 15$, and the value $R\_ut$ of carbon black volume fraction×dibutyl phthalate oil absorption number/100 for the undertread 152 is in the range $15 \le R\_ut \le 35$. This is advantageous in that the values described above of the cap tread 151 and the undertread 152 can be appropriately set.

Additionally, in the pneumatic tire 1, the modulus $M\_cap$ of the cap tread 151 and the modulus $M\_ea$ of the earthing tread 7 have the relationship 5.0 Mpa$\le M\_ea-M\_cap$. In a configuration in which the cap tread 151 and the earthing tread 7 differ greatly in terms of physical properties, separation at the boundary face between the two and step wear between the two caused by a difference in ground contact pressure between the two tends to occur. This is advantageous, by applying to such a configuration, in effectively obtaining a suppression effect of the separation at the boundary face between the earthing tread 7 and the cap tread 151 and the step wear between the earthing tread 7 and the cap tread 151.

In the pneumatic tire 1, the rubber hardness $H\_cap$ of the cap tread 151 and the rubber hardness $H\_ea$ of the earthing tread 7 have the relationship $5 \le H\_ea - H\_cap$. In a configuration in which the cap tread 151 and the earthing tread 7 differ greatly in terms of physical properties, separation at the boundary face between the two and step wear between the two caused by a difference in ground contact pressure between the two tends to occur. This is advantageous, by applying to such a configuration, in effectively obtaining a suppression effect of the separation at the boundary face between the earthing tread 7 and the cap tread 151 and the step wear between the earthing tread 7 and the cap tread 151.

In the pneumatic tire 1, the width W1 of all of the road contact surface of the block 5 and the total width W2 of the portion of the undertread 152 that projects outward in the tire radial direction beyond the imaginary line L (in a cross-sectional view in the tire meridian direction, the line running parallel with the road contact surface of the block 5 through a point 20% of a maximum groove depth H0 of the main groove 22, 23 from the maximum groove depth position of the main grooves 22, 23 is defined as the imaginary line L) have the relationship $0.60 \le W2/W1$ (see FIG. 3). In such a configuration, the gauge of the undertread 152 with a high rubber hardness ($H\_cap \le H\_ut$) and the disposed region are made appropriate. This is advantageous in appropriately ensuring the rigidity of the block 5. Additionally, the gauge of the undertread 152 with a low volume resistivity is ensured, and the electrical resistance of the tire is appropriately reduced.

In the pneumatic tire 1, the undertread 152 includes a thickened portion 1521 in a region between the earthing tread 7 and at least one of the edge portions of the block 5 (see FIGS. 3 and 4). The gauge Ga of the undertread 152 gradually increases from the earthing tread 7 toward the edge portion of the block 5 due to the thickened portion 1521. In such a configuration, the gauge Ga of the undertread 152 with a high modulus is reduced at or near the boundary portion between the earthing tread 7 and the cap tread 151 and, due to the thickened portion 1521, gradually increases toward the edge portion of the block 5. This is advantageous in that the difference in ground contact pressure of the block road contact surface at the boundary portion between the earthing tread 7 and the cap tread 151 is made uniform and the separation and step wear described above is suppressed to be generated.

In the pneumatic tire 1, the distance H1 in the groove depth direction of the main groove 23 (22) from the maximum depth position of the groove 23 (22) to the point P1 (the point P1 is defined as the point on the outer circumferential surface of the undertread 152 where the gauge Ga of the undertread 152 is at the maximum value, in the region between the earthing tread 7 and the edge portion of the block 5) and the maximum groove depth H0 of the main groove 23 (22) have the relationship $H1/H0 \leq 0.50$ (see FIG. 4). This is advantageous in that the gauge Ga of the thickened portion 1521 of the undertread 152 is appropriately ensured, and the difference in ground contact pressure at the block road contact surface at the boundary portion between the earthing tread 7 and the cap tread 151 is made uniform.

In the pneumatic tire 1, the distance H2 in the groove depth direction of the circumferential main groove 22 (23) from the maximum depth position of the main groove 23 (22) to the point P2 (defined as the point where the gauge Ga of the undertread 152 in the region between the earthing tread 7 and the point P1 is the minimum value Ga2) and the maximum groove depth H0 of the main groove 23 (22) have the relationship $0.20 \leq H2/H0$ (see FIG. 4). This is advantageous in that the gauge Ga of the undertread 152 between the earthing tread 7 and the thickened portion 1521 is appropriately reduced, and the difference in ground contact pressure at the block road contact surface at the boundary portion between the earthing tread 7 and the cap tread 151 is made uniform.

In the pneumatic tire 1, the gauge Ga1 at point P1 and gauge Ga2 at point P2 of the undertread 152 have the relationship $0.5 \text{ mm} \leq Ga1-Ga2 \leq 3.0 \text{ mm}$ (see FIG. 4). This is advantageous in that the protrusion amount (gauge difference Ga1−Ga2) of the thickened portion 1521 of the undertread 152 can be appropriately set. In other words, by satisfying $0.5 \text{ mm} \leq Ga1-Ga2$, the protrusion amount of the thickened portion 1521 is ensured and the effect of making uniform the difference in ground contact pressure of the block road contact surface at the boundary portion between the earthing tread 7 and the cap tread 151 is ensured. Also, by satisfying $Ga1-Ga2 \leq 3.0 \text{ mm}$, an increase in ground contact pressure of the edge portion of the block 5 caused by an excessive protrusion amount of the thickened portion 1521 is suppressed and uneven wear of the edge portion of the block 5 is suppressed.

In the pneumatic tire 1, the width W3 of the road contact surface of the block 5 in the region between the earthing tread 7 and the edge portion of the block 5 and the width W1 of all of the road contact surface of the block 5 have the relationship $0.20 \leq W3/W1$ (see FIG. 3). This is advantageous in that the distance from the earthing tread 7 to the edge portion of the block 5 can be ensured, and the thickened portion 1521 of the undertread 152 can be appropriately formed.

In the pneumatic tire 1, the distance D1 in the tire lateral direction from the point P1 to the edge portion in the block 5 and the width W3 of the road contact surface of the block 5 in the region between the earthing tread 7 and the edge portion of the block 5 have the relationship $0.02 \leq D1/W3 \leq 0.25$ (see FIG. 4). This is advantageous in that the position of the point P1 where the thickened portion 1521 of the undertread 152 is the maximum is appropriately set. In other words, by satisfying $0.02 \leq D1/W3$, an increase in ground contact pressure of the edge portion of the block 5 caused by the thickened portion 1521 being located at or near the edge portion of the block 5 is suppressed. Also, by satisfying $D1/W3 \leq 0.25$, the effect of making uniform the difference in ground contact pressure of the block road contact surface via the thickened portion 1521 is appropriately ensured.

In the pneumatic tire 1, the width W4 of the thickened portion 1521 of the undertread 152 and the width W3 of the road contact surface of the block 5 in the region between the earthing tread 7 and the edge portion of the block 5 have the relationship $0.30 \leq W4/W3 \leq 0.70$ (see FIG. 4). This is advantageous in that the width W4 of the thickened portion 1521 is appropriately set. In other words, by satisfying $0.30 \leq W4/W3$, the width W4 of the thickened portion 1521 is ensured and the slope of the thickened portion 1521 from the point P2 to the point P1 is made gentle. This appropriately ensures the effect of making uniform the different in ground contact pressure of the block road contact surface via the thickened portion 1521. Also, by satisfying $W4/W3 \leq 0.70$, an increase in ground contact pressure of the edge portion of the block 5 caused by the excessive width W4 of the thickened portion 1521 is suppressed.

In the pneumatic tire 1, the width We1 of the earthing tread 7 at the road contact surface of the block 5 and the width We2 of the earthing tread 7 at the connection portion with the undertread 152 have the relationship $We1 \leq We2$ (see FIG. 5). This is advantageous in that the electrical conductivity of the earthing tread 7 from the undertread 152 to the block road contact surface is improved.

Additionally, in the pneumatic tire 1, the block 5 includes the plurality of sipes 6 (see FIG. 2), and the maximum depth position of each of the sipes 6 is located further inward in the tire radial direction than the boundary face between the cap tread 151 and the undertread 152 (see FIG. 3). This is advantageous in that cracking originating at the bottom portion of the sipe 6 is suppressed to be generated.

In the pneumatic tire 1, the block 5 includes a plurality of narrow shallow grooves 8 that extend through the earthing tread 7 in the tire lateral direction in the road contact surface of the block 5 (see FIG. 2). This is advantageous in that the difference in ground contact pressure between the earthing tread 7 and the cap tread 151 is alleviated, and the separation and step wear at the boundary portion between the two is suppressed to be generated.

EXAMPLES

Figure 10:
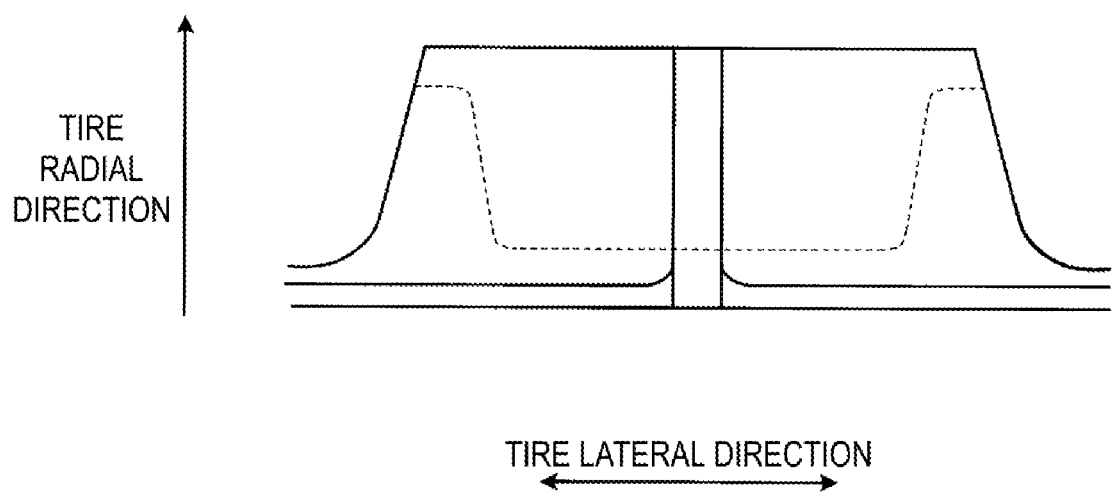
FIG. 10 is an explanatory diagram illustrating a test tire of the Conventional Example.

FIGS. 9A-9B include a table showing the results of performance tests of pneumatic tires according to embodiments of the technology. FIG. 10 is an explanatory diagram illustrating a test tire of the Conventional Example.

In the performance tests, a plurality of mutually differing pneumatic tires were evaluated for (1) braking performance on ice, (2) electrostatic suppression performance (electrical resistance value), and (3) separation resistance performance (see FIGS. 9A-9B). In the performance tests, pneumatic tires having a tire size of 195/65R15 91Q were mounted on rims having a rim size of 15×6J, inflated to an air pressure of 210 kPa, and loaded with the load specified by JATMA. The pneumatic tires were mounted on the test vehicle, a four wheel drive sedan with an engine displacement of 3.0 L.

(1) In the evaluation relating to braking performance on ice, the test vehicle was driven on a predetermined icy road surface and the braking distance from a travel speed of 40 km/h was measured. The measurement results are expressed as index values and evaluated with the Conventional Example being assigned as the reference (100). In this evaluation, larger values are preferable.

(2) In the evaluation relating to electrostatic suppression performance, a voltage of 1000 V was applied under conditions of 23° C. temperature and 50% humidity and the resistance value ($\Omega$) between the tread contact surface and the rim was measured. Lower values indicate superior discharge properties, which is preferable.

(3) In the evaluation relating to separation resistance performance, durability testing using an indoor drum testing machine was conducted, and the running distance until tire failure was measured. The measurement results are expressed as index values and evaluated with the Conventional Example being assigned as the reference (100). In this evaluation, larger values are preferable.

The structures of the test tires according to Examples 1 to 10 are illustrated in FIGS. 1 to 5. The volume resistivity of the cap tread 151 is $1\times10^{10}$ $\Omega$·cm, and the volume resistivity of the undertread 152 and the earthing tread 7 is $1\times10^{6}$ $\Omega$·cm. The cord rubber of the carcass layer 13, the coating rubber of the belt plies 141 to 143 of the belt layer 14, and the rim cushion rubbers 17 are made from a rubber material with a volume resistivity of $1\times10^{7}$ $\Omega$·cm or less. The value R_cap of carbon black volume fraction×dibutyl phthalate oil absorption number/100 for the cap tread 151 is 7, and the value R_ut and the value R_ea of the undertread 152 and the earthing tread 7 is 18. The rubber hardness H_cap of the cap tread is 50, and the rubber hardness H_ut and the rubber hardness H_ea of the undertread 152 and the earthing tread 7 is 65. The undertread 152 and the earthing tread 7 are made from the same rubber material and have an integral structure. Thus, the undertread 152 and the earthing tread 7 have the same modulus. As illustrated in FIG. 3, the cap tread 151, the undertread 152, and the earthing tread 7 have a left-right symmetrical structure. The width W1 of all of the road contact surface of the block 5 is 25 mm, and the each width W3 (W31, W32) of the road contact surface of the block 5 from the earthing tread 7 to the left and right edge portions of the block 5 is 12 mm (W3/W1=0.48).

The block of the test tires of the Conventional Example and the Comparative Example have the internal structure illustrated in FIG. 10. Additionally, the earthing tread and the undertread are made from the rubber materials that differ in terms of the modulus each other, and the earthing tread extends through the undertread and is in contact with the belt layer. Note that for the cap tread, the earthing tread, and the undertread, the values for physical properties other than the modulus are the same as for the test tire of Example 1.

As can be seen from the test results, the pneumatic tires 1 of Examples 1 to 10 have improved braking performance on ice, electrostatic suppression performance, and separation resistance performance.

The invention claimed is:

1. A pneumatic tire, comprising:
a carcass layer;
a belt layer disposed outward of the carcass layer in a radial direction;
a tread rubber disposed outward of the belt layer in a radial direction; and
a plurality of main grooves and a plurality of blocks defined by the plurality of main grooves formed in a tread surface, the tread rubber comprising a cap tread forming the tread surface, an undertread disposed in a layer below the cap tread, and an earthing tread extending through the cap tread and exposed on a road contact surface of the plurality of blocks,
a modulus M_cap at 300% elongation of the cap tread ranging from 3.0 MPa to 7.0 MPa,
a modulus at 300% elongation of the undertread ranging from 10.0 MPa to 20.0 MPa,
a modulus at 300% elongation of the earthing tread is in a range 10.0 MPa≤M_ea≤20.0 MPa,
the modulus M_cap of the cap tread and the modulus M_ea of the earthing tread have a relationship 5.0 MPa≤M_ea−M_cap,
a rubber hardness H_cap of the cap tread and a rubber hardness H_ea of the earthing tread have a relationship 5≤H_ea−H_cap,
the earthing tread being made from a rubber material with a volume resistivity of $1\times10^{7}$ $\Omega$·m or less, and
the earthing tread being made from a same rubber material as the undertread and having an integral structure with the undertread.

2. The pneumatic tire according to claim 1, wherein
a value R_cap of carbon black volume fraction×dibutyl phthalate oil absorption number/100 for the cap tread is in a range 5≤R_cap≤15, and
a value R_ut of carbon black volume fraction×dibutyl phthalate oil absorption number/100 for the undertread is in a range 15≤R_ut≤35.

3. The pneumatic tire according to claim 1, wherein
a line running parallel with the road contact surface of the blocks and running through a point at a position 20% of a maximum groove depth position of the plurality of main grooves from the maximum groove depth position of the plurality of main grooves, in a cross-sectional view in a tire meridian direction, is defined as an imaginary line L, and
a width W1 of all of the road contact surface of the blocks and a total width W2 of a portion of the undertread that projects outward in a tire radial direction beyond the imaginary line L have a relationship 0.60≤W2/W1.

4. The pneumatic tire according to claim 1, wherein
the undertread comprises a thickened portion in a region between the earthing tread and an edge portion of the blocks, and
a gauge of the undertread gradually increases from the earthing tread toward the edge portion of the blocks due to the thickened portion.

5. The pneumatic tire according to claim 1, wherein
a point on an outer circumferential surface of the undertread where a gauge of the undertread is at a maximum value, in a region between the earthing tread and an edge portion of the blocks, is defined as a point P1, and a distance H1 in a groove depth direction of the plurality of main grooves from a maximum depth position of the plurality of main grooves to the point P1 and a maximum groove depth H0 of the plurality of main grooves have a relationship H1/H0≤0.50.

6. The pneumatic tire according to claim 1, wherein
a point on an outer circumferential surface of the undertread where a gauge of the undertread is at a maximum value Ga1, in a region between the earthing tread and an edge portion of the blocks, is defined as a point P1,
a point on the outer circumferential surface of the undertread where the gauge of the undertread is at a minimum value Ga2, in a region between the earthing tread and the point P1, is defined as a point P2, and
a distance H2 in a groove depth direction of the plurality of main grooves from a maximum depth position of the plurality of main grooves to the point P2 and a maximum groove depth H0 of the plurality of main grooves have a relationship 0.20≤H2/H0.

7. The pneumatic tire according to claim 6, wherein the gauge Ga1 at the point P1 and the gauge Ga2 at the point P2 of the undertread have a relationship 0.5 mm≤Ga1−Ga2≤3.0 mm.

8. The pneumatic tire according to claim 1, wherein a width W3 of the road contact surface of the blocks in a region between the earthing tread and an edge portion of the blocks and a width W1 of all of the road contact surface of the blocks have a relationship 0.20≤W3/W1.

9. The pneumatic tire according to claim 8, wherein
a point on an outer circumferential surface of the undertread where a gauge of the undertread is at a maximum value Ga1, in a region between the earthing tread and an edge portion of the blocks, is defined as a point P1, and
a distance D1 in a tire lateral direction from the point P1 to an edge portion of the blocks and the width W3 of the road contact surface of the blocks in the region between the earthing tread and the edge portion of the blocks have a relationship 0.02≤D1/W3≤0.15.

10. The pneumatic tire according to claim 8, wherein a width W4 of a thickened portion of the undertread and the width W3 of the road contact surface of the blocks in the region between the earthing tread and the edge portion of the blocks have a relationship 0.30≤W4/W3≤0.70.

11. The pneumatic tire according to claim 1, wherein a width We1 of the earthing tread at the road contact surface of the blocks and a width We2 of the earthing tread at a connection portion with the undertread have a relationship We1<We2.

12. The pneumatic tire according to claim 1, wherein the plurality of blocks each comprise a plurality of sipes, and a maximum depth position of the plurality of sipes is located further inward in a tire radial direction than a boundary face between the cap tread and the undertread.

13. The pneumatic tire according to claim 1, wherein the plurality of blocks each comprises a plurality of grooves extending through the earthing tread in a tire lateral direction in the road contact surface of the block.

14. The pneumatic tire according to claim 1, further comprising a plurality of lug grooves extending in the tire lateral direction; wherein the plurality of blocks are defined and formed by the main grooves and the lug grooves.

15. The pneumatic tire according to claim 1, wherein the rubber hardness H_cap of the cap tread and the rubber hardness H_ea of the earthing tread have a relationship 7≤H_ea−H_cap≤25.

16. A pneumatic tire, comprising:
a carcass layer;
a belt layer disposed outward of the carcass layer in a radial direction;
a tread rubber disposed outward of the belt layer in a radial direction; and
a plurality of main grooves and a plurality of blocks defined by the plurality of main grooves formed in a tread surface, the tread rubber comprising a cap tread forming the tread surface, an undertread disposed in a layer below the cap tread, and an earthing tread extending through the cap tread and exposed on a road contact surface of the plurality of blocks,
a modulus at 300% elongation of the cap tread ranging from 3.0 MPa to 7.0 MPa,
a modulus at 300% elongation of the undertread ranging from 10.0 MPa to 20.0 MPa,
the earthing tread being made from a rubber material with a volume resistivity of $1 \times 10^7$ Ω·cm or less,
the earthing tread being made from a same rubber material as the undertread and having an integral structure with the undertread,
a width W3 of the road contact surface of the blocks in a region between the earthing tread and an edge portion of the blocks and a width W1 of all of the road contact surface of the blocks having a relationship 0.20≤W3/W1,
a point on an outer circumferential surface of the undertread where a gauge of the undertread is at a maximum value Ga1, in a region between the earthing tread and an edge portion of the blocks, being defined as a point P1, and
a distance D1 in a tire lateral direction from the point P1 to an edge portion of the blocks and the width W3 of the road contact surface of the blocks in the region between the earthing tread and the edge portion of the blocks having a relationship 0.02≤D1/W3≤0.15.

* * * * *